US009995493B2

(12) United States Patent
Mowris et al.

(10) Patent No.: US 9,995,493 B2
(45) Date of Patent: Jun. 12, 2018

(54) EFFICIENT FAN CONTROLLER

(71) Applicants: Robert J. Mowris, Olympic Valley, CA (US); John Walsh, Bozeman, MT (US)

(72) Inventors: Robert J. Mowris, Olympic Valley, CA (US); John Walsh, Bozeman, MT (US)

(*) Notice: Subject to any disclaimer, the term of this patent is extended or adjusted under 35 U.S.C. 154(b) by 222 days.

(21) Appl. No.: 15/144,806

(22) Filed: May 2, 2016

(65) Prior Publication Data
US 2016/0245544 A1 Aug. 25, 2016

Related U.S. Application Data

(63) Continuation-in-part of application No. 14/168,503, filed on Jan. 30, 2014, now Pat. No. 9,328,933, which
(Continued)

(51) Int. Cl.
*F24F 11/00* (2018.01)
*F24D 19/10* (2006.01)
(Continued)

(52) U.S. Cl.
CPC .......... *F24D 19/1084* (2013.01); *F24F 11/70* (2018.01); *F24H 9/2071* (2013.01); *G05D 23/1951* (2013.01); *F24F 11/46* (2018.01)

(58) Field of Classification Search
CPC ................ F24F 11/0076; F24F 11/053; F24F 2011/0002; F24F 2011/0073;
(Continued)

(56) References Cited

U.S. PATENT DOCUMENTS 2,394,920 A   12/1942   Kronmiller
3,454,073 A   7/1969   Man
(Continued)

FOREIGN PATENT DOCUMENTS

WO   PCT/US1996/009118   6/1996
WO   WO 2013/149160   10/2013

OTHER PUBLICATIONS

Southern California Edison, Proctor Engineering Group, Ltd., Bevilacqua-Knight, Inc., Energy Performance of Hot Dry Air Conditioning Systems, Jul. 2008, p. 66, California Energy Commission (CEC), Sacramento, CA, USA, Available online at http://www.energy.ca.gov/2008publications/CEC-500-2008-056/CEC-500-2008-056.PDF.
(Continued)

*Primary Examiner* — Marc Norman
(74) *Attorney, Agent, or Firm* — Kenneth L. Green; Averill & Green

(57) ABSTRACT

An efficient fan controller for Heating Ventilating Air Conditioning (HVAC) systems including at least one electrical signal input from thermostat or equipment control terminals with a microprocessor to control a switching device connected to a signal output to control a fan relay and operate a system fan. The microprocessor is configured to monitor a thermostat call for cooling/heating duration and determine a variable fan-off delay based on the cooling cycle or heating cycle duration, and at an end of a cooling/heating cycle energize the fan relay to operate the system fan for the variable fan-off delay. The fan controller can include a heat pump detection signal input and electrical signal inputs to connect to a thermostat heat terminal, heat pump reversing valve terminal, or compressor terminal. The fan controller can also include a normally-closed relay connected to the switching device to maintain continuity between the fan signal input and output.

46 Claims, 10 Drawing Sheets

Related U.S. Application Data is a continuation-in-part of application No. 13/427,542, filed on Mar. 22, 2012, now Pat. No. 9,797,405, which is a continuation-in-part of application No. 13/085,119, filed on Apr. 12, 2011, now Pat. No. 8,763,920.

(60) Provisional application No. 61/324,229, filed on Apr. 14, 2010.

(51) Int. Cl.
*F24H 9/20* (2006.01)
*G05D 23/19* (2006.01)

(58) Field of Classification Search
CPC ............ F24F 2011/0075; F24H 9/2064; F24H 9/2071; G05D 23/1951
See application file for complete search history.

(56) References Cited

U.S. PATENT DOCUMENTS

| | | | |
|---|---|---|---|
| 3,454,078 A | 7/1969 | Elwart | |
| 3,489,345 A | 1/1970 | Moreland | |
| 3,912,162 A | 10/1975 | Bauer et al. | |
| 4,075,864 A | 2/1978 | Schrader | |
| 4,090,663 A | 5/1978 | Bonnie | |
| 4,136,730 A | 1/1979 | Kinsey | |
| 4,167,966 A | 9/1979 | Freeman | |
| 4,369,916 A | 1/1983 | Abbey | |
| 4,493,194 A | 1/1985 | Briccetti | |
| 4,684,060 A | 8/1987 | Adams | |
| 4,702,413 A | 10/1987 | Beckey et al. | |
| 4,773,587 A | 9/1988 | Lipman | |
| 4,842,044 A | 6/1989 | Flanders | |
| 5,050,488 A | 9/1991 | Beasley | |
| 5,142,880 A | 9/1992 | Bellis | |
| 5,228,307 A | 7/1993 | Koce | |
| 5,248,083 A | 9/1993 | Adams | |
| 5,397,970 A | 3/1995 | Rowlette | |
| 5,882,233 A | 3/1999 | Idehara | |
| 6,282,910 B1 | 9/2001 | Helt | |
| 6,464,000 B1 | 10/2002 | Kloster | |
| 6,684,944 B1 | 2/2004 | Byrnes | |
| 6,695,046 B1 | 2/2004 | Byrnes | |
| 6,708,135 B2 | 3/2004 | Southworth | |
| 6,940,051 B2 | 9/2005 | Tateishi | |
| 7,140,551 B2 | 11/2006 | de Pauw | |
| 7,191,826 B2 | 3/2007 | Byrnes | |
| 7,204,429 B2 | 4/2007 | Olney | |
| 7,240,851 B2 | 7/2007 | Walsh | |
| 8,141,373 B2 | 3/2012 | Peterson | |
| 8,362,725 B2 | 1/2013 | Becerra | |
| 8,965,586 B2 | 2/2015 | Miller et al. | |
| 9,043,034 B2 | 5/2015 | Miller et al. | |
| 9,410,713 B2 | 8/2016 | Lau | |
| 9,534,805 B2 | 1/2017 | Matsuoka | |
| 2003/0223172 A1 | 12/2003 | Priest | |
| 2004/0217182 A1* | 11/2004 | St. Jean | F23Q 7/24 237/2 A |
| 2005/0121531 A1 | 6/2005 | Walsh | |
| 2005/0150651 A1 | 7/2005 | Halsey | |
| 2009/0001179 A1* | 1/2009 | Dempsey | F24F 11/0001 236/49.3 |
| 2010/0187318 A1 | 7/2010 | Yu | |
| 2011/0234368 A1 | 9/2011 | Huang | |
| 2012/0104108 A1 | 5/2012 | Westberg | |
| 2012/0248211 A1 | 10/2012 | Warren | |
| 2015/0060038 A1 | 3/2015 | Lau | |
| 2015/0060557 A1 | 3/2015 | Lau | |
| 2015/0159905 A1 | 6/2015 | Lau | |
| 2016/0223219 A1 | 8/2016 | Lau | |
| 2017/0051936 A1 | 2/2017 | Lau | |

OTHER PUBLICATIONS

Proctor Engineering Group, Ltd., Hot Dry Climate Air Conditioner Pilot Field Test, Emerging Technologies Application Assessment Report #0603. Mar. 2, 2007, pp. 23-26, Pacific Gas and Electric (PG&E) Company, San Francisco, CA, USA, Available online at http://www.etcc-ca.com/reports/hot-dry-climate-air-conditioner-pilot-field-test.

Proctor Engineering Group, Ltd., Hot Dry Climate Air Conditioner Pilot Field Test Phase II, Emerging Technologies Program Application Assessment Report #0724, Feb. 8, 2008, pp. 15, 23, Pacific Gas and Electric (PG&E) Company, San Francisco, CA, USA, Available online at https://newbuildings.org/sites/default/files/PGE_2008_Pilot_Field_Test_Report.pdf.

Henderson, H., Shirey D., Raustad, R., Understanding the Dehumidification Performance of Air-Conditioner Equipment at Part-Load Conditions, Final Report FSEC-CR-1537-05, Florida Solar Energy Center, Cocoa, FL, USA, Jan. 2006, p. 1-1 and Appendix D, Available online at: See http://www.fsec.ucf.edu/en/publications/pdf/FSEC-CR-1537-05.pdf.

Khattar, M., Swami, M., Ramanan, N., Another Aspect of Duty Cycling: Effects on Indoor Humidity. ASHRAE Transactions vol. 93, Part 1, Jan. 1987, pp. 1678-1687, American Society of Heating Refrigerating and Air-Conditioning Engineers (ASHRAE), Atlanta, GA, USA, Available online at: http://www.fsec.ucf.edu/en/publications/html/FSEC-PF-118-87/index.htm.

Lovvorn, N., Hiller C., Heat Pump Life Revisited, ASHRAE Transactions Research, 2002 Annual Meeting. 2002, pp. 107-112. American Society of Heating Refrigerating and Air-Conditioning Engineers (ASHRAE), Atlanta, GA, USA.

Proctor Engineering Group, Ltd., Hot Dry Climate Air Conditioner (HDAC) Combined Field Test Report, Company Design & Engineering Services, Refrigeration and Thermal Test Center, Jul. 19, 2007, pp. 1 and 22, Southern California Edison Company, Irwindale, CA, USA, Available online at https://newbuildings.org/wp-content/uploads/2015/11/1140FieldTestRpt2_01.pdf.

California Utilities Statewide Codes and Standards Team, Codes and Standards Enhancement (CASE) Initiative: Residential Refrigerant Charge Testing and Related Issues, 2013 California Building Energy Efficiency Standards, Dec. 2011, pp. 51-61, Pacific Gas and Electric (PG&E) Company, San Francisco, CA, USA, Available online at http://www.energy.ca.gov/title24/2008standards/special_case_appliance/refrigerant/2013_CASE_R_Refrigerant_Charge_Testing_Dec_2011.pdf.

Proctor, J, Hairrell, A., An Innovative Product's Path to Market. The influence of laboratory and field evaluations on adoption and implementation, Aug. 2013, pp. 7-8, International Energy Program Evaluation Conference, Chicago, IL, USA, Available online at the following URL: https://www.iepec.org/conf-docs/conf-by-year/2013-Chicago/050.pdf#page=1.

McElwain, T., Troubleshooting Intermittent Ignition Systems for Gas Furnaces and Boilers, Feb. 28, 2011, pp. 1-6. Gas Training Institute, Warren, RI, USA, Available online at: https://heatinghelp.com/assets/documents/Troubleshooting-Intermittent-Ignition-Systems-for-Gas-Furnaces-and-Boilers.pdf.

Proctor Engineering Group Ltd., "Concept 3™ Furnace Fan Motor Upgrade," Prepared by Proctor Engineering Group. Date: Oct. 1, 2009. pp. 14. Published by Proctor Engineering.
Group Ltd., 65 Mitchell Blvd Ste 201, San Rafael, CA 94903.
Abram Conant. John Proctor, and Lance Elberling, "Field Tests of Specially Selected Air Conditioners for Hot Dry Climates," Published in the Proceedings of the 2008 American.
Council for an Energy Efficient Economy (ACEEE) Summer Study on Energy Efficiency in Buildings, Asilomar, California, Date: Aug. 2008, pp. 14, Washington, DC.
American Council for an Energy Efficient Economy (ACEEE), (ACEEE Conant 2008).

(56) References Cited

OTHER PUBLICATIONS

Energy Federation Inc., Promo—Concept 3 High Efficiency Motor, Date: Jan. 21, 2009, pp. 3, Published by Energy Federation Inc., 40 Washington St, Westborough, MA 01581 USA.

Proctor Engineering Group Ltd., Promo—Concept 3 PEG Calif—Photo, Date: Nov. 4, 2008, p. 1, Published by Proctor Engineering Group Ltd., 418 Mission Ave., San Rafael, CA 94901, USA.

Proctor Engineering Group Ltd., Enhanced Time Delay Relay Installation Procedure, Date: Nov. 28, 2006, pp. 4, Published by Proctor Engineering Group Ltd., 418 Mission Ave., San Rafael, CA 94901, USA.

Proctor Engineering Group Ltd., Air Conditioner Enhanced Time Delay Relay (DelayRelayFactSheet 3-LR.pdf), Date: Dec. 31, 2007, pp. 2, Published by Proctor Engineering Group Ltd., 418 Mission Ave., San Rafael, CA 94901, USA.

Conant, A., Proctor Engineering Group, Ltd., California Climate Air Conditioner Upgrade—Enhanced Time Delay Measure Codes H796 Cooling Optimizer Program, Work Paper PGE3PHVC150 Enhanced Time Delay Relay Revision # 1, Date: May 5, 2014, pp. 36, Published by PG&E Customer Energy Solutions, San Francisco, CA, USA Available online at: http://deeresources.net/workpapers.

California Utilities Statewide Codes and Standards Team, Codes and Standards Enhancement (CASE) Initiative: Residential Refrigerant Charge Testing and Related Issues, 2013 California Building Energy Efficiency Standards, Date: Dec. 2011, pp. 61, Published by Pacific Gas and Electric (PG&E) Company, San Francisco, CA, USA.

Proctor, J., Hairrell, A., An Innovative Product's Path to Market. The influence of laboratory and field evaluations on adoption and implementation, Date: Aug. 2013, pp. 13, Published by the International Energy Program Evaluation Conference (IEPEC), Chicago, IL, USA.

Southern California Edison, "SCEData.xls," embedded Excel workbookRef2 on p. 28 of PG&E 2014 (Reference 16), Date: Dec. 5, 2007, pp. 5, Pacific Gas and Electric (PG&E) Company, San Francisco, CA, USA Available online at: http://deeresources.net/workpapers.

Southern California Edison, Proctor Engineering Group, Ltd., Bevilacqua-Knight, Inc., Energy Performance of Hot Dry Air Conditioning Systems, Date: Jul. 2008. pp. 128, California Energy Commission (CEC), Sacramento, CA, USA.

Proctor Engineering Group, Ltd., Hot Dry Climate Air Conditioner Pilot Field Test, Emerging Technologies Application Assessment Report #0603, Date: Mar. 2, 2007, pp. 41, Pacific Gas & Electric Company (PG&E), San Francisco, CA, USA.

Proctor Engineering Group, Ltd., Hot Dry Climate Air Conditioner Pilot Field Test Phase II, Emerging Technologies Program Application Assessment Report #0724, Date: Feb. 8, 2008, pp. 39, Pacific Gas & Electric Company (PG&E), San Francisco, CA, USA.

Conant A., Proctor, A., Elberling, L., Field Tests of Specially Selected Air Conditioners for Hot Dry Climates, Published in the Proceedings of the 2008 ACEEE Summer Study on Energy Efficiency in Buildings, Asilomar, California, Date: Aug. 2008, pp. 14, American Council for an Energy Efficient Economy (ACEEE), Washington, DC, USA.

Proctor Engineering Group Ltd., Concept 3™ Furnace Fan Motor Upgrade, Date: Oct. 1, 2009, pp. 14, Published by Proctor Engineering Group Ltd., 65 Mitchell Blvd Ste 201, San Rafael, CA 94903, USA.

MARS Inc., SERIES 325 MARS solid state timers, MARS No. 32393 and 32378, Date: Sep. 4, 2007, pp. 1, Motors & Armatures, Inc. (MARS), 250 Rabro Drive East, Hauppauge, NY 11788, USA.

ICM Controls Inc., ICM 254 Post Purge Timers, Date: Oct. 2, 2007. pp. 1, ICM Controls Inc., 6333 Daedalus Drive, Cicero, N.Y. 13039, USA.

Proctor Engineering Group Ltd., California Air Conditioner Upgrade—Enhanced Time Delay Relay Residential, Work Paper WPPEGPGE0001, Date: May 18, 2008, pp. 15, Published by Proctor Engineering Group Ltd., 65 Mitchell Blvd. Suite 201, San Rafael, CA 94903, USA.

Proctor, J. Fan Controller for Extracting Evaporative Cooling from an Air Conditioning System, Date: Feb. 4, 2008, pp. 2, Electronic Filing Receipt for U.S. Appl. No. 61/026,058, John Proctor, 415 Mission Ave., San Rafael CA 94901, USA.

Proctor Engineering Group Ltd., Workpaper Extended Fan Time Delay Relay, Date: Feb. 9, 2007, pp. 7, Published by Proctor Engineering Group Ltd., 418 Mission Ave., San Rafael, CA 94901 USA.

Proctor Engineering Group Ltd., CheckMe!® Concept 3—Brush Free DC by McMillan Installation Instructions, Date: Dec. 31, 2008, pp. 7, Published by Proctor Engineering Group Ltd., 418 Mission Ave., San Rafael, CA 94901 USA.

Proctor Engineering Group Ltd., Promo—Concept 3 PEG Calif—Photo, Date: Dec. 31, 2008, p. 1, Published by Proctor Engineering Group Ltd., 418 Mission Ave., San Rafael, CA 94901, USA.

Proctor Engineering Group Ltd., Enhanced Time Delay Relay Installation Procedure, Date: Nov. 28, 2006, pp. 2, Published by Proctor Engineering Group Ltd., 418 Mission Ave., San Rafael, CA 94901, USA.

California Utilities Statewide Codes and Standards Team, Codes and Standards Enhancement (CASE) Initiative: Residential Refrigerant Charge Testing and Related Issues, 2013 California Building Energy Efficiency Standards, Date: Dec. 2011, pp. 51-61, Published by Pacific Gas and Electric (PG&E) Company, San Francisco, CA, USA.

Proctor, J., Hairrell, A., An Innovative Product's Path to Market. The influence of laboratory and field evaluations on adoption and implementation, Date: Aug. 2013, pp. 7-8, Published by the International Energy Program Evaluation Conference (IEPEC), Chicago, IL, USA.

* cited by examiner

EFFICIENT FAN CONTROLLER

CROSS-REFERENCE TO RELATED APPLICATIONS

The present application claims the priority of U.S. Provisional Patent Application Ser. No. 61/324,229 filed Apr. 14, 2010, and is a Continuation In Part of U.S. patent application Ser. No. 13/085,119 filed Apr. 12, 2011, and is a Continuation In Part of U.S. patent application Ser. No. 13/427,542 filed Mar. 22, 2012, and is a Continuation In Part of U.S. patent application Ser. No. 14/168,503 filed Jan. 30, 2014, which applications are incorporated in their entirety herein by reference.

BACKGROUND OF THE INVENTION

The present invention relates to a Heating, Ventilation, Air Conditioning (HVAC) fan controller device and in particular to a circuit providing an extended fan run time when such extended time improves overall efficiency.

Residential and commercial HVAC system power consumption in the United States accounts for 30% of average summer peak-day electricity loads, 14% of total electricity use, and 44% of total natural gas use, as reported by the US Energy Information Agency Residential and Commercial Energy Consumption Surveys from 2003 and 2009.

Known gas furnace central heating systems are controlled by thermostats which energize a relay to turn on the gas furnace heat source with a brief delay followed by turning on the heater ventilation fan at a lower fan speed than the higher fan speed used for cooling. Unfortunately, maintaining a lower heater ventilation fan speed often results in increased heat soak within the central heating unit and the portion of the heat generated by the heat source not delivered to conditioned space is lost to the environment. The heat loss increases the central heating unit operational time consuming more energy. Further, the amount of heat soak increases as the central heating unit is operated for longer periods of time leaving significantly more unrecovered energy and higher temperatures (i.e., 260 to 350 degrees Fahrenheit) in the heat exchanger after the heater ventilation fan is turned off. In most heating systems a significant portion of this unrecovered heating energy is wasted and lost to the environment after the heat source and the heater ventilation fan are tuned off.

Known direct-expansion cooling systems are controlled by thermostats which turn on a cooling ventilation fan when the cool source is energized and turn off the fan when the cool source is de-energized. When the cooling source is de-energized there is a significant amount of cold refrigerant left in the evaporator which is not used to deliver sensible cooling capacity to the conditioned space and this sensible cooling capacity is lost to the environment after the cool source and the cooling ventilation fan are tuned off. This increases the cooling system operational time and energy use.

Known heat pump, electric resistance, and hydronic heating systems are controlled by thermostats which turn on the ventilation fan when the hydronic heat source is energized and turn off the fan when the heat source is de-energized. Hydronic heating and cooling systems circulate a liquid from a central location to a heat exchanger in a forced air unit (FAU). Known heat pump and hydronic systems do not provide a fan-on delay. Nor do heat pump and hydronic systems provide a heating fan-off time delay due to lower heat exchanger temperatures of 130 to 180 degrees Fahrenheit which are 2 to 3 times lower than gas furnace heat exchanger temperatures. During the start-up period there is no useful heating delivered by the ventilation air which can waste fan energy and cause thermal comfort issues for building occupants. When the heat source is de-energized there is a significant amount of heating energy left in the heating coil which is not used to deliver heating capacity to the conditioned space and this heating capacity is lost to the environment after the heat source and the heating ventilation fan are tuned off. This increases the heat pump, electric resistance, or hydronic heating system operational time and energy use.

U.S. Pat. No. 6,684,944 (Brynes et al, 2004) and U.S. Pat. No. 6,695,046 (Brynes et al, 2004) disclose a variable speed fan motor control for forced air heating/cooling systems using an induction-type fan motor controlled by a controller circuit which is operable to continuously vary the speed of the fan motor during a start-up phase and a shut-down phase of the heating and/or cooling cycle. The controller circuit includes temperature sensors which are operable to control start-up and shutdown of the fan motor over continuously variable speed operating cycles in response to sensed temperature of the air being circulated by the fan. Brynes teaches control of the heater fan from low to high speed but the high speed is limited specifically to the motor speed used for heating which is low, medium, or medium high and not the motor's high speed used for cooling. Byrnes' patents do not include a method or a fan relay to energize the high speed used for cooling after a short time period when the heat exchanger has reached its maximum temperature to deliver more heating output to satisfy the thermostat temperature sooner and save heat source energy. Brynes' does not teach a variable fan-off time delay based on AC compressor or heat source operational time.

U.S. Pat. No. 4,369,916 (Abbey 1983) discloses a 120 VAC heating or cooling system fan override relay control to immediately start the blower to circulate air when the heating or cooling element turns on and continue to operate the override for a fixed timed interval by a time delay relay after the heating or cooling element turns off. U.S. Pat. No. 4,369,916 teaches starting the blower fan instantly when the heating element is turned on and not waiting for the heat exchanger to reach maximum temperature before turning the fan from the low speed used for heating to the high speed used for cooling. U.S. Pat. No. 4,369,916 does not vary the fan-off time delay based on air conditioning compressor or heat source operational time.

U.S. Pat. No. 6,464,000 (Kloster 2002) discloses is a temperature controlled device for a two-stage furnace: 1) low fan speed for low heat mode, and 2) higher fan speed for high heat mode. The higher fan speed is limited to available heater fan speeds; not the high speed used for cooling. U.S. Pat. No. 6,464,000 does not provide instructions for a variable fan-off time delay based on heat source operational time and does not provide instructions to initially operate the heater fan at the low speed used for heating and switch to the high speed used for cooling after the heat exchanger has reached maximum temperature.

U.S. Pat. No. 5,248,083 (Adams 1993) discloses an adaptive furnace controller using analog temperature sensing to maintain a constant preselected heat exchanger temperature (i.e., 120 Fahrenheit) during operation and operates the fan time delay until a fixed lower heat exchanger temperature (i.e. 90 Fahrenheit) is reached. The adaptive furnace control regulates a controllable valve to adjust burner firing rate, thereby holding heat exchanger operating temperature constant to create constant on/off times based on the previous cycle on/off times of the furnace by regulating circulation blower speed. By increasing blower speeds to shorten "on" times or decreasing blower speeds to increase "on" times, and thereby achieving optimum cycle times.

ICM Controls, Inc. (www.icmcontrols.com) has manufactured on delay/off delay controls for HVAC circulating fans for more than 25 years. The ICM fan delays connect between the fan "G" terminal of a thermostat to an HVAC fan relay used to energize the HVAC fan, but the on delay/off delay are fixed time delays and only have one input and one output to interrupt and control the fan. The present invention monitors the fan "G" signal as a proxy for AC compressor operation and varies the extended fan-off time delay for cooling based on AC compressor operational time.

U.S. Pat. No. 5,142,880 (Bellis, 1992) discloses a solid state control circuit for use in connection with existing low-voltage thermostat terminals of a split-system or packaged HVAC system having a refrigerant system compressor and condenser with outdoor fan and an evaporator and gas-fired furnace or electrical heating elements with indoor blower fan. The U.S. Pat. No. 5,142,880 relates generally to systems for increasing the efficiency of air conditioning units by continuing the blower run time after the compressor is turned off. Specifically, the U.S. Pat. No. 5,142,880 claims an air conditioning control unit comprising a low voltage room thermostat fan terminal, a low voltage compressor relay terminal, a timing circuit means, a sensitive gate triac, and a power triac. The U.S. Pat. No. 5,142,880 also claims a method for controlling the on-off time of an indoor fan that is controlled by and associated with an indoor thermostat for a room air conditioning system. The apparatus of the U.S. Pat. No. 5,142,880 is not programmable or adaptable. It does not have a fixed delay from one system to another. The delay is related to the supply voltage, which varies from system to system. Bellis provides constant current to the triac gates on the order of 6 milliamps. The total current draw is even higher than that when all components are included. Many systems have do not accommodate this much current draw through control relays without causing a humming noise which irritates the user. The Bellis design momentarily de-energizes the relay when switch from thermostat driven fan to his delay. This can cause relay chatter and excessive wear. Bellis does not provide for an override function if the unit fails. The Bellis design is a "fixed" delay. Bellis does not disclose a variable fan-off time delay based on air conditioning compressor or heat source operational times or increasing the heater fan speed from the low speed used for heating to the high speed used for cooling after the heat exchanger has reached the approximate maximum temperature.

In U.S. Pat. No. 5,882,233 Noto teaches of a device used to extend the fan run time and also periodically activate the fan during times the system is not calling for heating or cooling. Noto requires the circuit to have access to the 24 VAC signals from the AC transformer. This requirement precludes his device from being connected directly to the thermostat since most thermostats do not have both the hot and neutral legs of the transformer. Household wiring only provides the hot (red) signal to the transformer. Although Noto teaches of a range of delays, his invention uses fixed times for the delays. The delays in Noto's invention are not based on the duration of the air conditioning compressor or heat source operational time.

U.S. Pat. No. 4,842,044 (Flanders et al., 1989) provides a heating and cooling control system that works by energizing a fan or other fluid circulating device to circulate fluid and effect thermal transfer of energy from the fluid to the spaces being heated and by de-energizing the circulating means at a selected time interval after de-energization of he heating and control system. The U.S. Pat. No. 4,842,044 also claims a heating control system comprising a switching means to effect energization of the fluid circulating means, a switching control means that is energizable in response to operation of the control circuit, and an additional circuit means that energizes the switching control means a selected time interval after de-energization of the heating system. The U.S. Pat. No. 4,842,044 is intended to increase the time the fan is turned on after a heating cycle to improve energy efficiency. The device draws power continuously from the gas solenoid through a 680 ohm resistor, and this method has proven to be problematic in practice. Too much current drawn in this way, can cause a humming noise in the gas valve and false operation. The U.S. Pat. No. 4,842,044 also enables the fan relay to activate the blower as soon as the gas valve is activated. This results in cool air being circulated throughout the home since the plenum is not sufficiently warm. Normal heat operation retards the blower until the temperature in the plenum reaches a preset operating temperature.

The U.S. Pat. No. 4,842,044 also requires the addition of a relay circuit. This relay must be active the entire time the fan is to be off, creating a significant current draw even when the system is in not calling for heating or cooling. The U.S. Pat. No. 4,842,044 also describes fixed delays. It has no way to adapt the fan delay times either by user input or by the compressor run time. The delays provided by the U.S. Pat. No. 4,842,044 are also subject to the variations of the components selected. Additionally, although Flanders touches on the subject of how his invention works when the fan switch on the thermostat is moved from the AUTO position to the ON position, as described, there is no way for the fan to come on when the occupant requests.

In U.S. Pat. No. 4,136,703 Kinsey teaches of a device that intervenes with the controls coming from a thermostat and going to the heating/cooling system. The U.S. Pat. No. 4,136,703 discloses a fixed upper limit to the time that the compressor or heating source can be activated and then his invention adds additional time to the blower fan. This activity can increase the efficiency of an air conditioner system by allowing a certain amount of water to condense on the evaporator coil and then re-evaporating this water to cool the home. The amount of water collected will vary based on the humidity of the ambient air. Having a fixed compressor run time with a fixed blower time can create a less efficient system than the current invention. In many environments, limiting the compressor run time and counting on evaporative cooling to reduce the home's temperature will increase the time required to cool the home. In many cases, the desired set point may never be achieved.

In U.S. Pat. No. 7,240,851, Walsh teaches about a furnace fan timer. The Walsh device is strictly a timer with a user programmable interval and duration. The device runs continuously in a never ending loop counting down minutes before operating the fan and then counting the minutes to keep the fan activated. Walsh's device is not compatible with air conditioner systems. Most thermostats connect the fan switch to the air conditioner compressor switch when operating in the automatic fan mode. In systems with air conditioners, Walsh's invention will activate the air conditioner compressor when it turns on the fan. This requires users to turn off the circuit breakers for their air conditioner systems when using his device. Walsh's invention has two interchangeable wire connections.

In U.S. Pat. No. 2,394,920, Kronmiller (assigned to Honeywell) teaches of an HVAC thermostat device to control room temperatures using a pair of thermally responsive bimetallic strips mounted within a circular-shaped housing to control space cooling or heating equipment using low voltage signals. In U.S. Pat. No. 7,140,551, de Pauw (assigned to Honeywell) teaches of a similar HVAC thermostat device with a simplified user interface and circular-shaped housing to control space cooling or heating equipment using low voltage signals. U.S. Pat. Nos. 2,394,920 and 7,140,551 provide no instructions about how to monitor the fan, AC compressor, or heat source to provide a variable fan-off time delay to recover and deliver useful cooling and heating energy otherwise wasted. The prior patents do not teach about increasing heater fan speed from the low speed used for heating to the high speed used for cooling.

BRIEF SUMMARY OF THE INVENTION

The present invention addresses the above and other needs by providing an efficient fan controller consisting of a circuit, AC-DC converter, zero crossing detector, signal conditioner, microprocessor, switching device, optional user interface, optional battery, and leads to connect to HVAC thermostat terminals or an HVAC equipment terminal block and system transformer, to provide efficient control of an HVAC fan. The efficient fan controller microprocessor receives low-voltage input signals from the HVAC system and determines forced air unit system type, mode of operation, and appropriate output signals to enable variable fan-on time delays, high speed fan operation during heating mode for applicable systems, and variable fan-off time delays to reduce energy use and improve energy efficiency of the HVAC system.

In accordance with one aspect of the invention the efficient fan controller can determine the following forced air unit system type and modes of operation based on input signals to the microprocessor: 1) direct-expansion air conditioning system in cooling mode, 2) heat pump system in cooling mode, 3) gas furnace system in heating mode, 4) heat pump system in heating mode, 5) hydronic coil system in heating mode, and 6) electric resistance heating system in heating mode.

In accordance with another aspect of the invention for direct-expansion air conditioning systems in cooling mode, the efficient fan controller can energize a fan relay after a short fan-on time delay period P0 based on the previous HVAC system off-cycle time period P11 to allow the refrigerant in the air conditioning evaporator to cool down before energizing the fan relay in order to avoid delivering undesirable warm air into the conditioned space to improve customer satisfaction and cooling efficiency compared to known fan control.

In accordance with one aspect of the invention for direct-expansion air conditioning systems in cooling mode, the efficient fan controller can energize the fan relay for an extended variable fan-off time delay P2 after an air conditioning compressor has stopped operating where the variable fan-off time period P2 is based on the air conditioning compressor cooling cycle duration P3 defined as a cooling on time from when the thermostat initiates a call for cooling until the thermostat terminates the call for cooling or the cooling cycle duration is defined as a cooling off time defined from when the thermostat terminates the call for cooling until the thermostat initiates the call for cooling plus the cooling on time. The extended variable fan-off time delay period P2 increases sensible cooling from the evaporator coil to increase cooling capacity delivered to the conditioned space, improve overall efficiency, extend the off cycle time, and save energy.

In accordance with another aspect of the invention for a gas furnace system in heating mode, the efficient fan controller can increase the heater ventilation fan speed from the low speed used for heating to the high speed used for cooling after a short time period P1 after the heat exchanger has reached its approximate maximum temperature to improve heat transfer, deliver more heating capacity and increase warm air movement and circulation in the conditioned space to satisfy the thermostat set point in less time to reduce heating system operation, and therefore reduce energy use and improve heating efficiency compared to known fan control.

In accordance with another aspect of the invention for a gas furnace system in heating mode, the efficient fan controller can continue the HVAC ventilation fan operation for an extended variable fan-off time delay period P2 after the gas furnace heat source has stopped operating. The variable fan-off time delay period P2 is determined based on gas furnace heating cycle duration P3 defined as the heating on time from when the thermostat initiates a call for heating until the thermostat terminates the call for heating or the heating cycle duration P3 is defined as the heating off time defined from when the thermostat terminates the call for heating until the thermostat initiates the call for heating plus the heating on time. The extended variable fan-off time delay period P2 recovers additional heat from the heat exchanger to increase heating capacity delivered to the conditioned space, improve overall efficiency, extend the off cycle time, and saves energy.

In accordance with another aspect of the invention for heat pump, electric resistance, or hydronic systems in heating mode, the efficient fan controller can energize a fan relay after a short fan-on time delay period P0 based on the previous HVAC system off-cycle time period P11 to allow the hydronic heating coil to heat up before energizing the fan relay in order to avoid delivering undesirable cool air to the conditioned space to improve customer satisfaction and heating efficiency compared to known fan control.

In accordance with another aspect of the invention for heat pump, electric resistance, or hydronic systems in heating mode, the efficient fan controller can energize a fan relay after an extended variable fan-off time delay period P2 after the air conditioning compressor or heat source turn-off allows recovery of additional cooling from an evaporator to increase sensible cooling capacity, or heat from a heat exchanger delivered to the conditioned space, thereby improving efficiency, extending the off cycle time, and saving energy.

In accordance with another aspect of the invention, the efficient fan controller circuit provides an extended fan-off time delay P2 based on monitoring of a thermostat "G" terminal (provides a fan relay signal) or a thermostat "Y" terminal (provides an AC compressor signal) or a thermostat "W" terminal (provides a heat source signal) or a heat pump reversing valve "O" or "BR" terminal (provides a heating or cooling reversing valve signal).

In accordance with another aspect of the invention, the fan controller increases the sensible cooling or heating capacity delivered to the conditioned space and improves the application energy efficiency ratio of an air conditioning system or the heating efficiency of a heating system. In known HVAC systems, the HVAC fan is turned off when the compressor or heat source are turned off or shortly after the compressor or heat source are turned off. The cooling evaporator is very cold when the compressor is turned off and the heating coil or heat exchanger are very hot when the heat sources are turned off. Continuing to run the HVAC fan for a period of time P2 after the AC compressor or heat source are turned off, based on AC compressor or heat source operational time P3, provides additional cooling or heating to the conditioned space. The additional cooling takes advantage of cold water which has condensed on the evaporator coils. By running the HVAC fan after the compressor has stopped, the cold water is evaporated and the system functions as an evaporative cooler, especially in hot dry climates. Additional heating takes advantage of very hot heating coil or heat exchanger temperatures. Increasing the delivered sensible cooling or heating capacity will extend the off cycle time period P11, reduce operational time P3, and increase energy efficiency. The sensible cooling or heating capacity are responsible for satisfying the thermostat set point, which determines air conditioner or furnace operational time and energy use. Laboratory and field studies have shown the efficient fan controller improves gas furnace, heat pump, or hydronic heating efficiency by 4 to 21 percent above conventional systems with fixed-time delays and 8 to 30 percent above conventional systems with no time delay. For heating systems with degraded conventional temperature delay sensors, the fan controller improves heating efficiency by 9 to 30 percent. Laboratory studies have shown the efficiency fan controller improves cooling efficiency 4 to 23 percent above conventional time delay and 7 to 41 percent above no time delay.

In accordance with still another aspect of the invention, there is provided a fan controller apparatus connected by as few as three electrical leads to terminals of common HVAC thermostats or equipment terminal blocks. The fan controller uses the information from the thermostat to determine an extended time delay for the fan based on the run time of the compressor or fan switch or heat source. In one embodiment, all delay calculations are done autonomously using an algorithm based on AC compressor/fan run time or heat source run time. The delays improve HVAC unit sensible cooling and heating capacity, energy efficiency, and reduce unnecessary supply fan operation during unoccupied periods.

In accordance with another aspect of the invention, there is provided a fan controller easily connected to existing HVAC systems. Many new air conditioning systems incorporate a fixed fan-off delay directly into their new products. Older air conditioning systems do not include any fan-off time delay. The efficient fan controller allows the delay to be applied to new and existing HVAC systems.

In accordance with still another aspect of the invention, there is provided a fan controller circuit including a microprocessor, an AC/DC converter, a zero crossing detector, and one or more switching devices. The fan controller may be an external fan controller connected directly to existing HVAC thermostat terminals or equipment terminal leads with minimal need for rewiring. The fan controller receives power present in the HVAC thermostat leads or the 24 VAC HVAC equipment transformer. The fan controller can operate with a minimum of three leads which can be connected directly to the wiring presently connected to known HVAC thermostats or equipment terminal blocks. The fan controller generally only requires electrical connection to existing 24 VAC transformer, and control terminals of the thermostat.

In accordance with yet another aspect of the invention, there is provided a fan controller including at least one switching device. Many suitable switching devices may be used to provide the requisite function. When the switching device is an electro-mechanical switch, the fan controller further can include a battery to power the microprocessor when the switch is closed, or 24 VAC power from the AC transformer. In one embodiment, the switching device is a trial. The fan controller circuit selectively gates the trial for milliseconds, and in doing so, has a total current draw on the order of 100 microamps allowing use of the fan controller without an additional power source added to the HVAC system. The trial draws very little power when the heating/cooling system is not active since there is no relay to be controlled.

In accordance with still another aspect of the invention, the fan controller uses a 60 Hz electrical signal as a time base providing precise timing which does not vary from system to system or due to aging or temperature of the components.

In accordance with another aspect, there is provided a fan controller which controls the fan relay through the entire cycle without interruption, preventing relay chatter and excessive wear.

In accordance with still another aspect, the fan controller restores all thermostat connections to their original states when turned off, providing continued HVAC system function if the fan controller fails.

In accordance with yet another aspect, the fan controller does not limit the amount of time the compressor operates and thus maintains system efficiency. The fan controller relies on the thermostat to determine when the desired set point has been reached, and only then does it extend the fan run time. This ensures occupant comfort and provides for the efficiency gains during and at the end of the cycle.

In accordance with yet another aspect, the fan controller works with HVAC systems containing both heating and air conditioning. Known HVAC systems require a user interface to enter information. The fan controller may contain a user interface, but does not require one. The fan controller measures the air conditioning compressor cooling cycle duration or the heating cycle duration and determines the variable fan-off delay time automatically. The fan controller interrupts the signal from the thermostat to the fan relay and overrides the fan control. The fan controller can monitor supply fan, heat source, or compressor operation and turn off the supply fan during unoccupied time periods to reduce unoccupied supply fan operational energy.

In accordance with another aspect of the invention, there is provided a fan controller using fan speeds native to the HVAC system. The fan controller does not require temperature sensors to control the fan and does not use variable speed operating modes for the fan.

BRIEF DESCRIPTION OF THE SEVERAL VIEWS OF THE DRAWING

The above and other aspects, features and advantages of the fan controller will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the efficient fan controller (or EFC) invention. This description is not to be taken in a limiting sense, but is made merely for the purpose of describing one or more preferred embodiments of the invention. The scope of the invention should be determined with reference to the claims.

Figure 1:
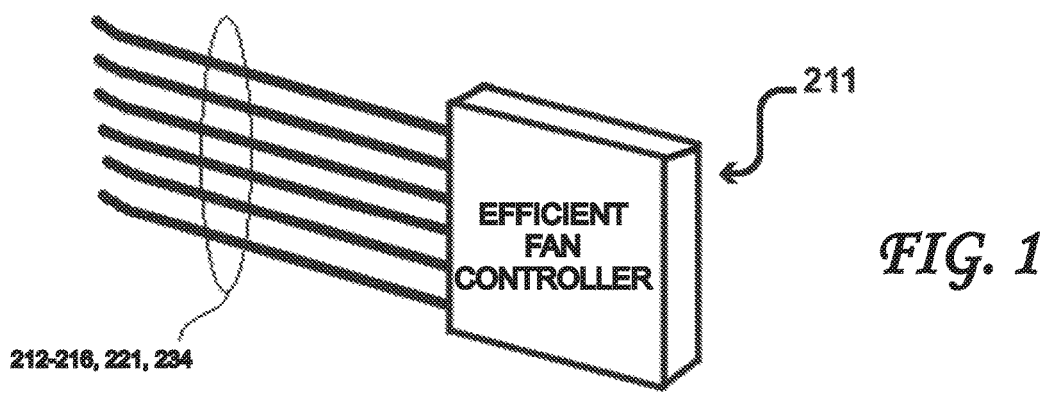
FIG. 1 shows a fan controller according to the present invention for installation at a thermostat or at the HVAC equipment terminal block.

FIG. 1 shows a fan controller 211 according to the present invention for installation at a thermostat or at an HVAC equipment terminal block. The efficient fan controller 211 includes leads 212-222.

Figure 2:
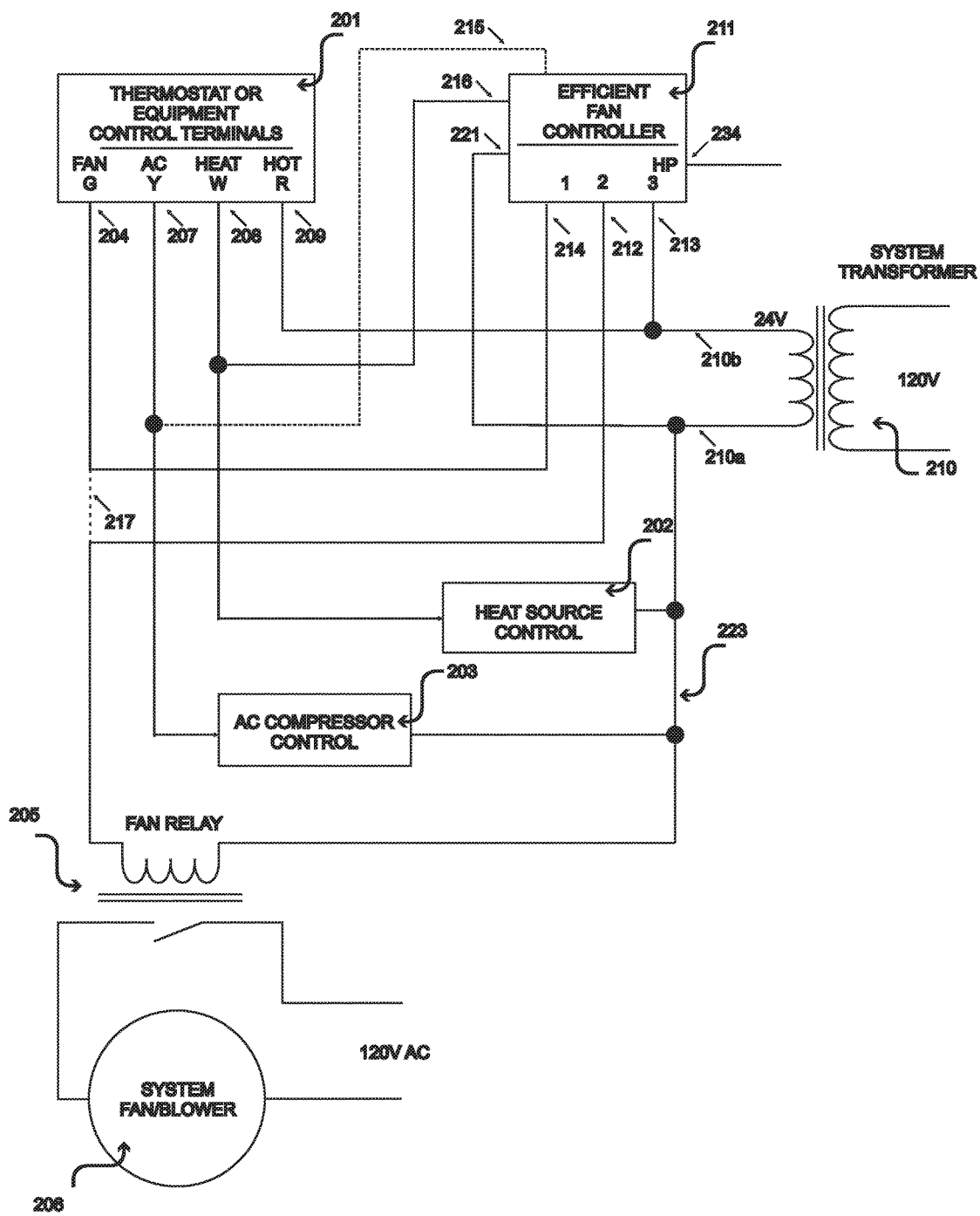
FIG. 2 shows the fan controller according to the present invention connected to an HVAC system with gas furnace, electric resistance, or hydronic heating coils.

FIG. 2 shows the efficient fan controller 211 connected to an HVAC system with AC compressor control (203) for direct-expansion cooling and heat source (202) for gas furnace, electric resistance, or hydronic heating. The following existing thermostat or equipment control terminals (201) are connected and transmitting low-voltage signals to the efficient fan controller (211):

1) Fan signal "G" 204 transmits voltage signals to the efficient fan controller 211 through input lead 214;

2) cooling signal AC "Y" 207 transmits voltage signals to the efficient fan controller 211 through input lead 215;

3) heat source signal HEAT "W" 208 transmits voltage signals to the through input lead 216;

4) system transformer (210) common 24 VAC signal is connected to the efficient fan controller 211 through input lead 221; and 5) system transformer Hot "R" 209 is connected to the efficient fan controller 211 by lead 213 or optionally connected to efficient fan controller 211 lead 234 for connecting to enable control for a heat pump system.

The dashed line 217 indicates where the original thermostat fan signal wire to the fan relay (205) has been disconnected in order to route this signal to the efficient fan controller 211 and transfer control of the fan relay 205 to the efficient fan controller 211. The efficient fan controller 211 transmits a low-voltage control signal to the fan relay 205 through efficient fan controller 211 output signal 212.

Figure 3:
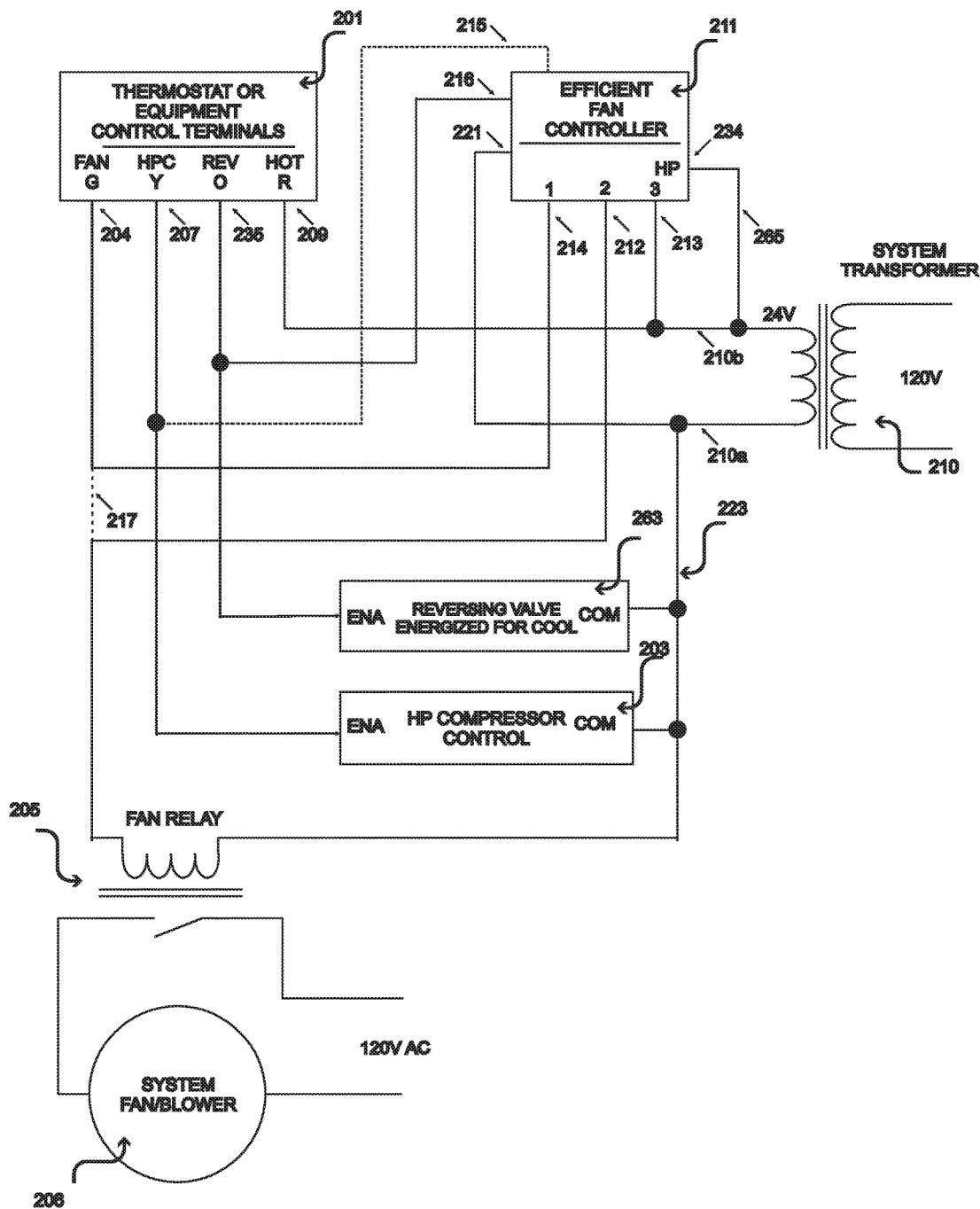
FIG. 3 shows the fan controller according to the present invention connected to a heat pump HVAC system with reversing valve energized for cooling.

FIG. 3 shows the efficient fan controller 211 connected to an HVAC system with AC compressor control 203 for direct-expansion cooling and heat pump reversing valve 263 energized for cooling. The efficient fan controller 211 is connected directly to the following existing thermostat or equipment control terminals 201 connected and transmitting low-voltage signals to the efficient fan controller 211:

1) FAN "G" 204 transmits voltage signals to the efficient fan controller 211 through input lead 214;

2) AC "Y" 207 transmits voltage signals to the efficient fan controller 211 through input lead 215;

3) reversing valve REV "O" 235 transmits voltage signals to the efficient fan controller 211 through input lead 216;

4) system transformer (210) common 24 VAC is connected to the efficient fan controller 211 through input lead 221; and 5) system transformer Hot "R" 209 is connected to the efficient fan controller 211 by lead 213 and connected to efficient fan controller 211 lead 234.

When the efficient fan controller 211 detects current flowing in both the positive cycle and negative cycle on the lead 213, the efficient fan controller 211 responds to control for a heat pump system by energizing the reversing valve 263 for cooling mode. The dashed line 217 indicates where the original thermostat fan signal wire to the fan relay (205) has been disconnected in order to route this signal to the efficient fan controller 211 input 214. The efficient fan controller transmits a low-voltage control signal to the fan relay 205 through efficient fan controller 211 output signal 212.

Figure 4:
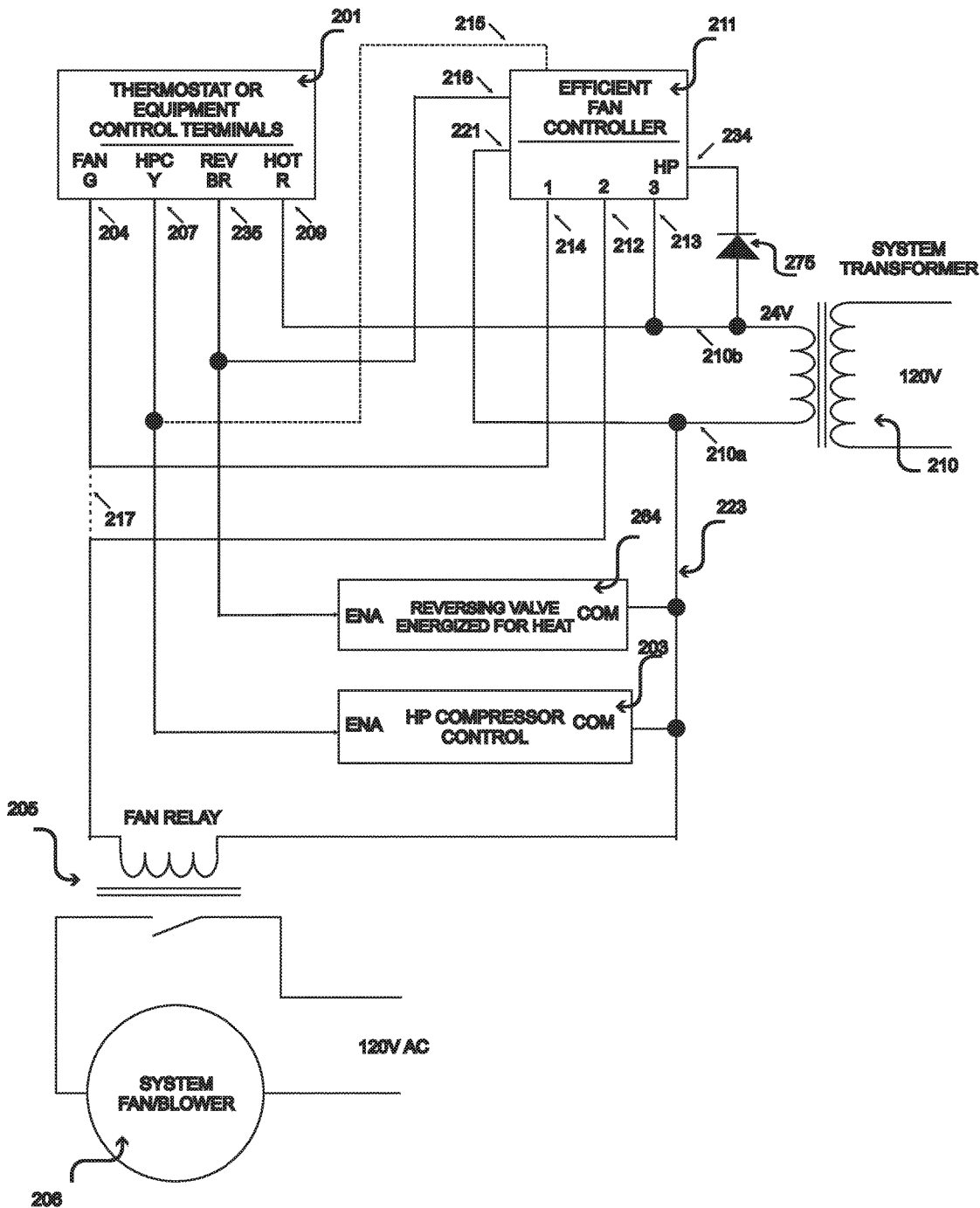
FIG. 4 shows the fan controller according to the present invention connected to a heat pump HVAC system with reversing valve energized for heating.

FIG. 4 shows the efficient fan controller 211 connected to an HVAC system with AC compressor control (203) for direct-expansion cooling and heat pump reversing valve energized for heat (264). The efficient fan controller 211 is connected directly to the following existing thermostat or equipment control terminals (201) connected and transmitting low-voltage signals to the efficient fan controller (211):

1) FAN "G" 204 transmits voltage signals to the efficient fan controller 211 through input lead 214;

2) AC "Y" 207 transmits voltage signals to the efficient fan controller 211 through input lead 215;

3) reversing valve REV "BR" 235 transmits voltage signals to the efficient fan controller 211 through input lead 216;

4) system transformer (210) common 24 VAC is connected to the efficient fan controller 211 through input lead 221; and 5) system transformer Hot "R" 209 is connected to the efficient fan controller 211 by lead 213 and also connected to efficient fan controller 211 lead 234 with a diode 275.

The diode 275 only allows current to flow to the efficient fan controller 211 on positive cycles of the system transformer hot signal (209). By seeing current flowing only during the positive cycle and not on the negative cycle, the efficient fan controller 211 is commanded to control for a heat pump system with reversing valve energized for heating mode. The dashed line 217 indicates where the original thermostat fan signal wire to the fan relay (205) has been disconnected in order to route this signal to the efficient fan controller 211 input 214. The efficient fan controller transmits a low-voltage control signal to the fan relay 205 through efficient fan controller 211 output signal 212.

Figure 5:
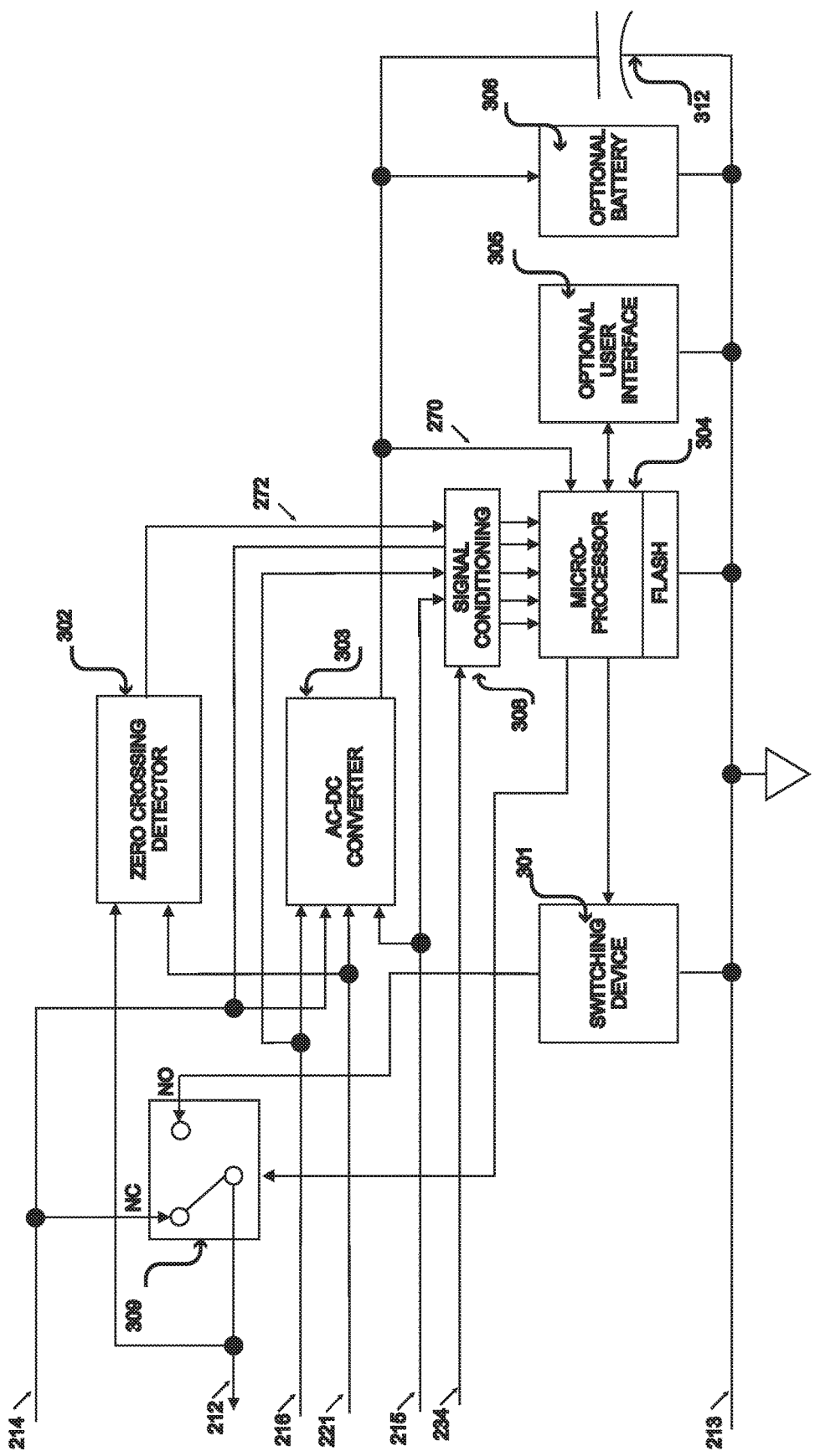
FIG. 5 shows elements of the efficient fan controller according to the present invention for HVAC systems with direct-expansion air conditioning, gas furnace, heat pump, electric resistance, or hydronic heating.

FIG. 5 shows components of the efficient fan controller 211 used for systems with gas furnace, electric resistance, heat pump or hydronic heating. A switch 309 is a normally closed relay which connects the input lead (214) signal from the thermostat to the fan relay control (212). In this way, if the efficient fan controller 211 device fails, the FAN "G" 204 is connected to the fan relay 205 and the system will perform as if the efficient fan controller 211 was not in the control loop.

In normal operation, when the efficient fan controller 211 is controlling the fan relay 205, the relay 309 is enabled and the switching device 301 output is presented to the fan relay control signal 212. The efficient fan controller 211 has the following input signals from the thermostat:

fan enable 214, A/C compressor enable 215;
heat source enable 216; and
heat pump mode 234.

The efficient fan controller 211 has a single output 212 which is the signal to enable the fan relay 205.

The input signals 214, 215, 216, and 234 and an output of the zero crossing detector 302 pass through a signal conditioning circuit 308 before being passed to the microprocessor 304. The signal conditioning circuit 308 shifts the level of the thermostat inputs to a level that will not harm the microprocessor 304. The microprocessor 304 is used to control switching devices 301 and 309. The microprocessor 304 also has an input from a zero crossing detector 302. This zero crossing detector 302 may monitor either the current feeding through the fan relay 205 via output signal 212 or a neutral leg 210b (see FIG. 2) of the system transformer 210. When monitoring the signal 212, which is normally an output of the efficient fan controller 211 to the fan relay 205, the fan relay 205 has the leg opposite signal 212 tied to the neutral leg 210b of the system transformer 210. Current can flow from that neutral leg 210b, up through the fan relay 205 and into the efficient fan controller 211 since the efficient fan controller 211 ground is referenced to the hot leg 210b of the system transformer 210.

The zero crossing detector 302 then presents a zero crossing signal 272 to the microprocessor 304 which enables the microprocessor to determine when the system transformer input signal 221 passes above zero volts and below zero volts. This information is used to count cycles for timekeeping purposes and to determine when to activate the switching device 301. The zero crossing times are also required when the switching device 301 is a triac. To operate the triac as a switch, the triac must be fired at all zero crossing transitions.

The AC-DC converter 303 has inputs from the system transformer 221 as well as the thermostat output signals for heat source enable signal 216, compressor enable signal 215, and fan enable signal 212. Any of these signals can be rectified in the AC-DC converter to provide DC power to the microprocessor 304 and to keep an optional battery 306 charged.

The switching device 301 is controlled by the microprocessor 304 and connects the efficient fan controller 211 input 213 to the fan relay control line 212 which in turn, energizes the fan relay 205. The output of switching device 301 is routed through the normally closed relay 309 which when operating properly is switched by the microprocessor 304 to the normally open position allowing a complete circuit from the switching device 301 to the fan relay control output 212.

There is also an optional user interface 305 which may be used to configure the microprocessor 304 to perform in an alternate manner. An optional battery 306 is also shown which could be used in the event that common wire 221 is not present and the switching device 301 is not a triac. A Heat Pump (HP) signal 234 is passed through the signal conditioning 308 element before being passed to the microprocessor. By nature of the zero crossing detector 302, the microprocessor 304 knows when thermostat signals should be above ground and below ground. If the HP signal 234 is not connected to the system transformer 210 as shown in FIG. 2, the microprocessor 304 detects the HP signal 234 is floating and performs like it is connected to a conventional HVAC system. If the HP signal 234 is connected to the system transformer 210 as shown in FIG. 3, the microprocessor 304 sees the HP signal 234 driven above and below ground and preforms like it is connected to a heat pump system with the reversing valve driven for cooling.

When a diode 235 is introduced as shown in FIG. 4, the HP signal 234 is driven during the positive cycle and floats because of the direction of the diode 275, during the negative cycle where the signal is rectified. The microprocessor 304 detects this state and performs like it is connected to a heat pump system with a reversing valve driven for heating. Because the microprocessor 304 is powered by the AC to DC converter 303, using an AC signal, the system is free to define hot and neutral as the opposite of what the original installation intended. The efficient fan controller 211 basically "floats" electronically and as a result is able to use the only wire coming to the thermostat (Hot) as a ground. As discussed above, the microprocessor 304 is configured to detect four low-voltage electrical input signal states: 1) ground or zero VAC, 2) 24 VAC, 3) floating signal, and 4) rectified signal.

The microprocessor 304 performs several major functions. In terms of timing, the microprocessor 304 keeps track of seconds and minutes by either monitoring the output from the zero crossing detector 302, or by counting microprocessor clock cycles. Each positive zero crossing accounts for $\frac{1}{60}$th of a second; therefore, sixty positive crossings occur each second. The seconds are then accumulated to keep track of minutes. The negative crossings are also monitored to provide timing for the switching device 301.

The efficient fan controller 211 draws power through the HVAC thermostat or equipment terminal block C common 223 of the 24 VAC transformer 210 (see FIG. 2, FIG. 3, or FIG. 4). The switching device 301 could be standard relay type device, a reed relay or some other electro-mechanical device, and could also be a solid state device such as an FET switch or a triac. In the event that an electro-mechanical switch was used, either an optional battery would be added to power the microprocessor 304 or the inputs 215, 216 or 221 could provide power through the AC-DC converter when the switch is closed. A preferred embodiment of the fan controller uses only the 24 VAC Hot 213 from the system transformer 210 and a triac 301 and does not require a battery.

The microprocessor 304 continuously monitors all inputs to determine if there is any change to the current system operation. In one embodiment, the microprocessor 304 contains FLASH memory, which allows the unit to store the programming instructions and data when there is no power applied to the unit.

The microprocessor 304 monitors the duration of the following thermostat or equipment terminal signals 201: fan "G" 204, AC compressor "Y" 207, and/or heat "W" 208 and adjusts the variable fan-off delay accordingly. If the AC compressor 203 or heat source 202 are operated for a short period of time and there is not much condensation stored on the evaporator or heat stored in the heat exchanger, then the fan relay 205 and system fan/blower 206 operating time will be extended for a shorter period of time or not at all. Likewise, if the AC compressor 203 operates longer allowing more condensate to be stored on the evaporator, or heater 202 operates longer storing more heat in the heat exchanger, then the efficient fan controller 211 will energize the fan relay 205 and operate the system fan/blower 206 for a longer fan-off delay period of time after the AC compressor 203 or heat source 202 have stopped. Timing table and/or algorithms may be modified for particular HVAC system, environments, user preferences, and the like.

In the embodiment of the efficient fan controller 211 using a triac as the switching device 301, the microprocessor 304 does not enable the triac at exactly the zero crossing of the 24 VAC signal. Instead, the microprocessor 304 delays an amount of time into the positive going cycle and allows the positive going waveform to provide a small amount of charge into the AC/DC circuitry. After a small charge has been accumulated, the microprocessor 304 enables the triac to pass the remainder of the power through to the fan relay 205. The AC waveform rises for a short period and then completely shorts out for the duration of the cycle, which passes this energy on to the fan relay 205 and thus actuates it. In this way, the fan relay 205 gets the majority of the AC waveform and actuates, while enough charge is stored by the AC/DC circuitry to keep the microprocessor 304 running until the next positive going cycle of the AC waveform.

In another embodiment of the fan controller, a battery 306 is used to supply power to the microprocessor 304 when the efficient fan controller 211 is actuating the fan relay 205. In this embodiment, the 24 VAC signal would be passed to the fan relay 205. This method is less complex but increases the cost of the invention and adds an item (the battery 306) that requires maintenance and periodic replacement.

Figure 6:
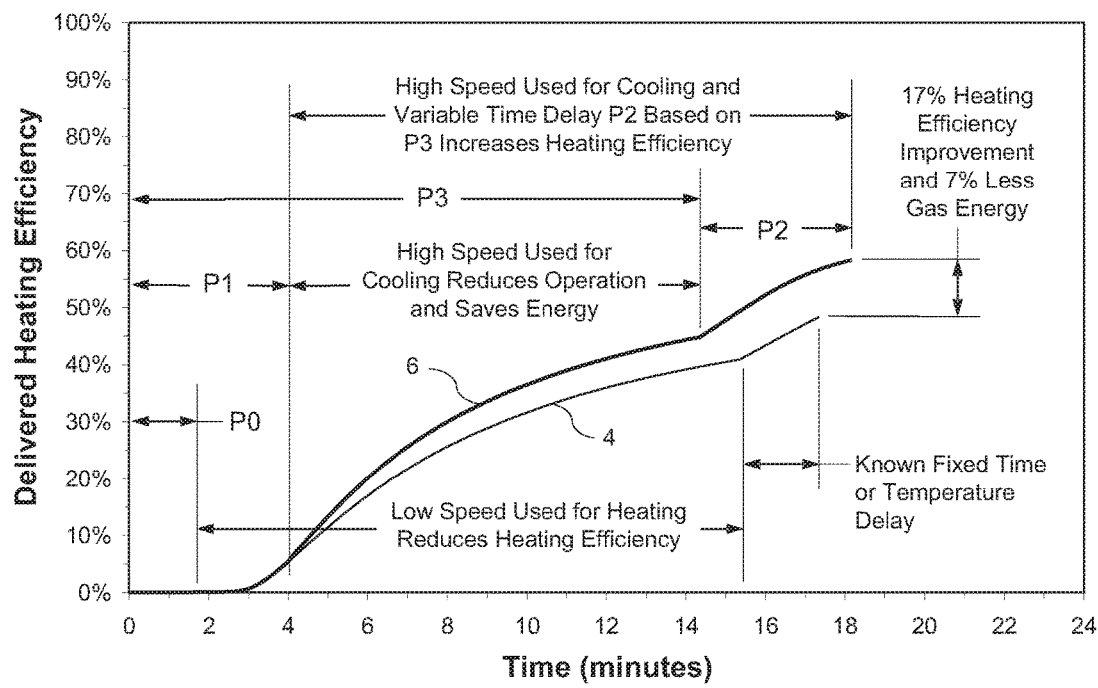
FIG. 6 shows a graph of delivered gas furnace heating efficiency for a known HVAC system fan control and the fan control according to the efficient fan controller.

FIG. 6 shows a graph comparing delivered heating efficiency for the known HVAC fan control 4 and efficient fan control 6. The efficient HVAC fan control 6 improves heating system efficiency and reduces gas furnace operation by increasing fan speed from the low speed used for heating to the high speed used for cooling after time period P1 after the heat exchanger reaches maximum temperature. The efficient HVAC fan control 6 also maximizes heat recovery from the heat exchanger after the heat source is turned off with an extended variable fan delay based on the heating cycle duration P3 defined as the heating on time from when the thermostat initiates a call for heating until the thermostat terminates the call for heating or the heating cycle duration is defined as the heating off time defined from when the thermostat terminates the call for heating until the thermostat initiates the call for heating plus the heating on time. Known fixed-time or temperature fan-off delay control 4 wastes more energy by leaving the heat exchanger with significantly higher temperatures of 260 to 380 degrees Fahrenheit. FIG. 6 shows the efficient HVAC fan control 6 improving heating efficiency by 17% and reducing gas use by 7% compared to known control 4.

Figure 7:
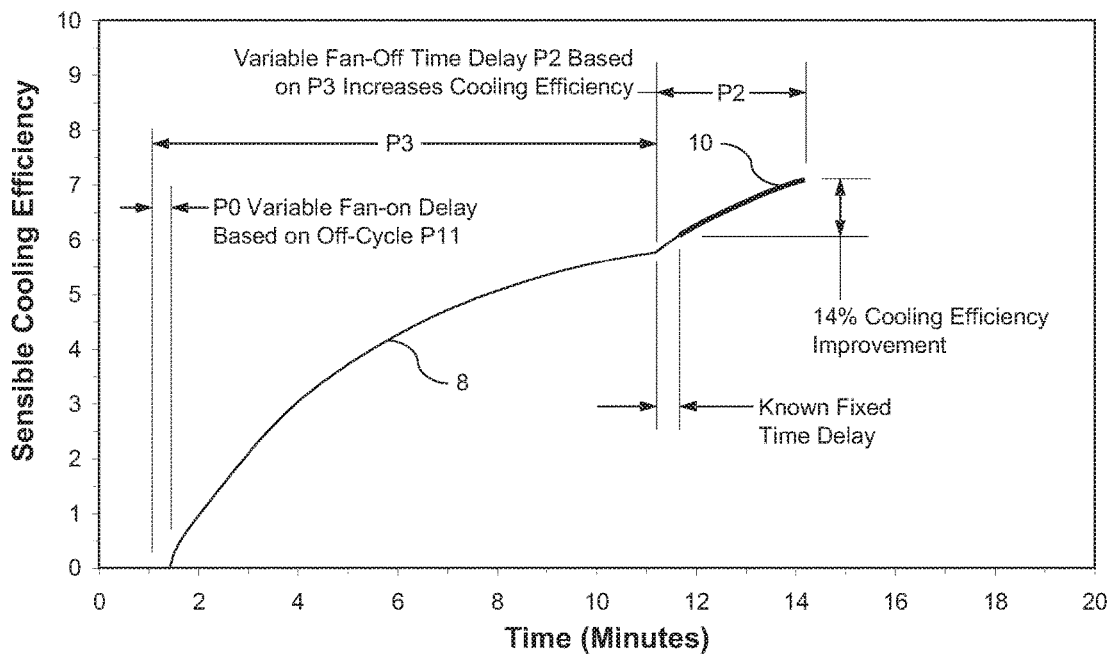
FIG. 7 shows a graph of direct-expansion air conditioning sensible cooling efficiency for the known HVAC fan control and the fan control according to the efficient fan controller.

FIG. 7 shows a graph comparing sensible cooling efficiency for the known HVAC fan control 8 and efficient fan control 10. The efficient fan controller 211 control 10 monitors and controls the HVAC fan and calculates a short fan-on delay P0 based on the previous cooling off-cycle duration P11. The efficient fan control 10 improves cooling system efficiency and maximizes sensible cooling recovery from the evaporator after the AC compressor is turned off with an extended variable fan delay based on the AC compressor cooling cycle duration P3 defined as a cooling on time from when the thermostat initiates a call for cooling until the thermostat terminates the call for cooling or the cooling cycle duration is defined as the cooling off time is defined from when the thermostat terminates the call for cooling until the thermostat initiates the call for cooling plus the cooling on time. Known fixed-time delay control 8 wastes energy by leaving the evaporator with significantly more available yet unrecovered sensible cooling energy. FIG. 7 shows the efficient HVAC fan control 10 improving sensible cooling efficiency by 14% compared to known control 8.

Figure 8:
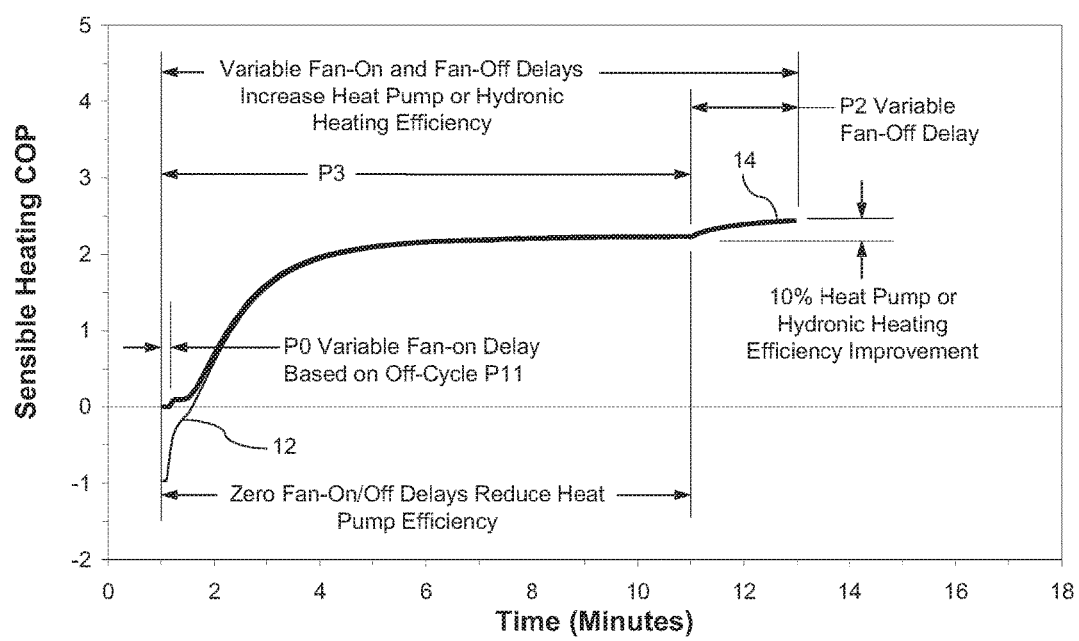
FIG. 8 shows a graph of delivered heat pump or hydronic heating efficiency for the known HVAC fan control and the fan control according to the efficient fan controller.

FIG. 8 shows a graph comparing heating COP for the known HVAC fan control 12 and efficient fan control 14. The efficient fan controller 211 control 14 monitors and controls the HVAC fan and calculates a short fan-on delay P0 based on the previous heating off-cycle duration P11. The efficient fan control 14 improves heating efficiency and maximizes heat recovery from the heat pump coil after the HP compressor is turned off with an extended variable fan delay based on the HP compressor heating cycle duration P3 defined as the heating on time from when the thermostat initiates a call for heating until the thermostat terminates the call for heating or the heating cycle duration is defined as the heating off time defined from when the thermostat terminates the call for heating until the thermostat initiates the call for heating plus the heating on time. Known fixed-time delay control 12 wastes energy by leaving the heat pump coil with significantly more available yet unrecovered sensible heating energy. FIG. 8 shows the efficient fan control 14 improving heating efficiency by 10% compared to known control 12.

Figure 9:
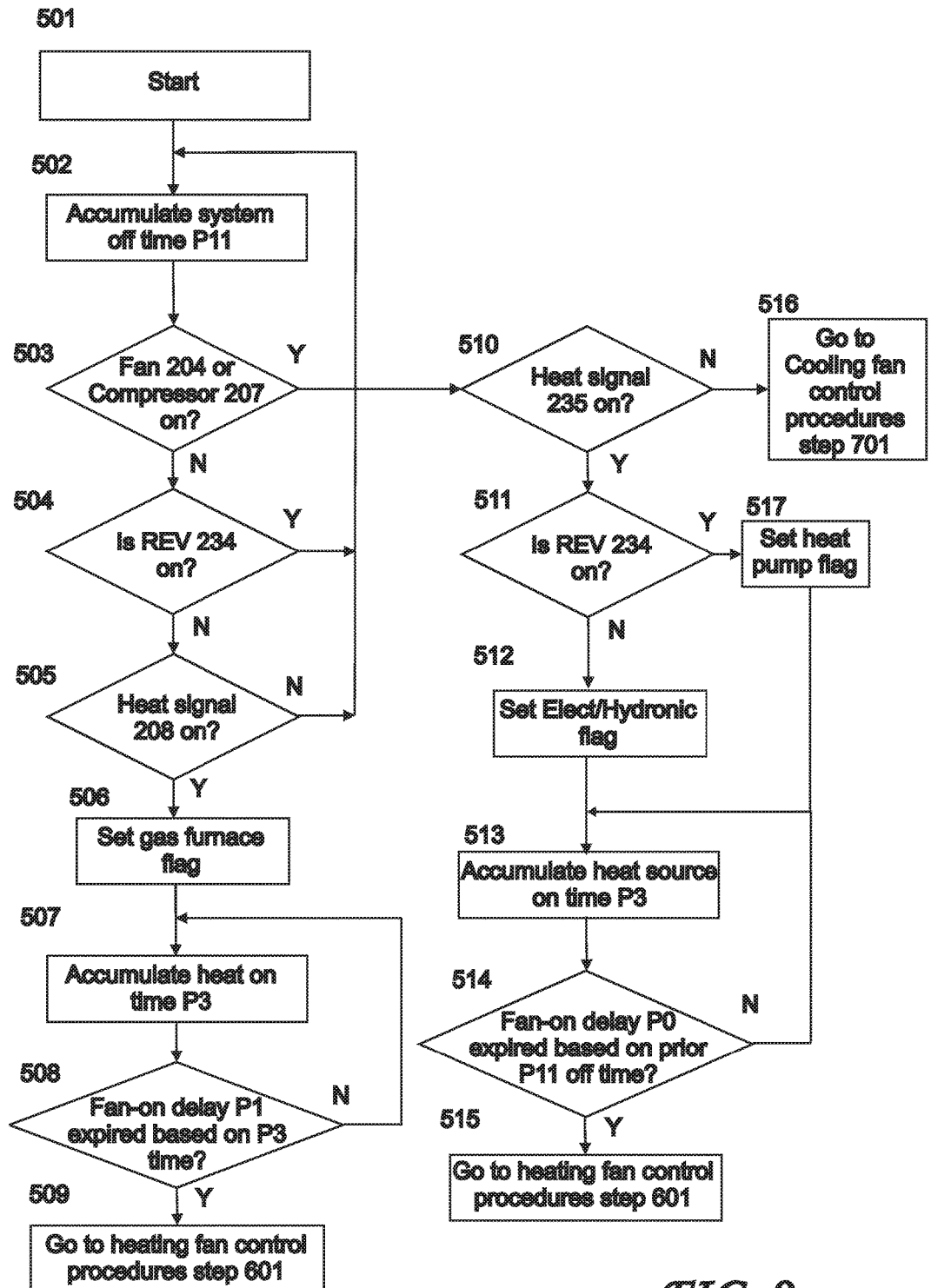
FIG. 9 shows a first method for determining what type of system is connected and what operational mode to execute, according to the present invention.

FIG. 9 shows a first method for the efficient fan controller used to determine what type of system is connected and what operational mode to execute. Step 501 is the reset point of the software and the point which is used once the variable fan-off delay P2 is completed. If not already done, switch 309 is moved from the normally closed position to the normally open position to connect the fan output signal 212 to the switch 301. Step 502 is used to keep track of the amount of time the system has been idle. This time is accumulated to P11 and is referenced when there is a fan-on time delay P0 for the start of the fan. In some systems, the fan start time is delayed by P0 before being energized while the heat or cooling source is brought to operational temperature. Step 503 is used by the efficient fan controller to determine if the fan signal 204 received by efficient fan controller input 214 or the compressor signal 207 received by efficient fan controller input 215 is active. If either signal is active, the efficient fan controller then determines whether the heat source is active simultaneously which would indicate either a heat pump, electric heat, or hydronic heat. If the fan signal 204 is not active, then the efficient fan controller drops to Step 504 to determine if it is configured for heat pump operation by connecting input HP 234 to the hot side of the system transformer 210*b* through wire 265 for a heat pump with reversing valve normally energized for cooling (see FIG. 3) or a wire with a diode 275 for a heat pump with reversing valve normally energized for heating (see FIG. 4). Step 504 is used to determine if HP 234 is connected to the hot side of the system transformer 210*b*. If HP 234 is connected to the hot side of the system transformer 210*b*, either with a wire 265 or a diode 275, then the efficient fan controller knows it is connected to a heat pump. If the efficient fan controller is connected to a heat pump, and the fan signal 204, or compressor signal 207 are not active, then the efficient fan controller can ignore the signal on the Heat W 208 since the main driver of a heat pump is the compressor and the efficient fan controller will determine that the compressor is not energized. Step 505 is enabled after the efficient fan controller determines that the HP 234 input is floating and not connected to the hot side of the system transformer 210b. Step 505 is then used by the efficient fan controller to check if the Heat "W" signal 208 to input 216 is active. If heat signal 208 to input 216 is active and no other inputs are active, then the efficient fan controller knows the system is a gas furnace and the thermostat is calling for heating. Step 506 sets a flag to indicate that the system is a gas furnace in heating mode. Step 507 is the entry in to the loop that accumulates heat source operational time P3 while the gas furnace is operating before the fan-on time delay P1 has expired. The fan-on time delay P1 is used to activate the system fan. Step 508 determines whether or not the fan-on time delay P1 has expired. If time P1 has not expired, then the efficient fan controller continues to accumulate gas furnace operational time P3. If fan-on delay time P1 has expired, the efficient fan controller immediately jumps to Step 509 and Step 601 for heating fan control procedures (see FIG. 10). Step 602 activates the switch 301 which drives a 24 VAC signal to the output 212 which in turn activates the fan relay 205 and turn on the system fan.

Step 510 is entered after the efficient fan controller 211 has detected that either the fan signal 204 or compressor signal 207 are active in Step 503. Step 510 checks if the HP reversing valve signal REV 235 to input 216 is active as well (see FIGS. 3 and 4). If the REV signal 235 to input 216 is not active, then the efficient fan controller knows the system is either in cooling mode or fan only mode and jumps to Step 516 and Step 701 to continue with cooling fan control procedures. If the REV signal 235 to input 216 is active simultaneously with the fan signal 204 to input 214 or compressor signal 207 to input 215, then the efficient fan controller proceeds to Step 511 and examines the HP 234 signal. Step 511 checks to see if the efficient fan controller is connected to a heat pump by the HP signal 234 connected to the system transformer hot signal 210b. If the HP 234 signal is connected to the hot side system transformer 210b, then the efficient fan controller goes to Step 517 to set a flag to indicate the efficient fan controller is connected to a heat pump system in heating mode and the thermostat is actively calling for heat. If the HP 234 is floating, then the efficient fan controller has determined it is connected to an electric or hydronic heating system and heat is being called for by the thermostat 201. Step 512 sets a flag indicating that the efficient fan controller is in electric or hydronic heating mode. Step 513 is the entry for a loop used to accumulate heat source time P3 for a fan-on delay time P0 based on the previous off-cycle time P11 during which the heating element is allowed to reach operational temperature. Step 513 accumulates the heat operational time P3 prior to expiration of the fan-on delay time P0. Step 514 is used to determine whether or not the fan-on delay time P0 has expired. If the system has been off for a longer period of time, then the fan-on time delay P0 is increased as it would take longer for the heating element (or heating coil) to reach a useful heating temperature required to deliver warm air to the conditioned space. The efficient fan controller may set the heating fan-on time delay P0 to zero. In Step 514, after the fan-on delay time P0 has expired, the efficient fan controller immediately jumps to Step 515 and Step 601 for heating fan control procedures (see FIG. 10). Step 602 activates the switch 301 which drives a 24 VAC signal to the output 212 which in turn activates the fan relay 205 and turn on the system fan.

Figure 10:
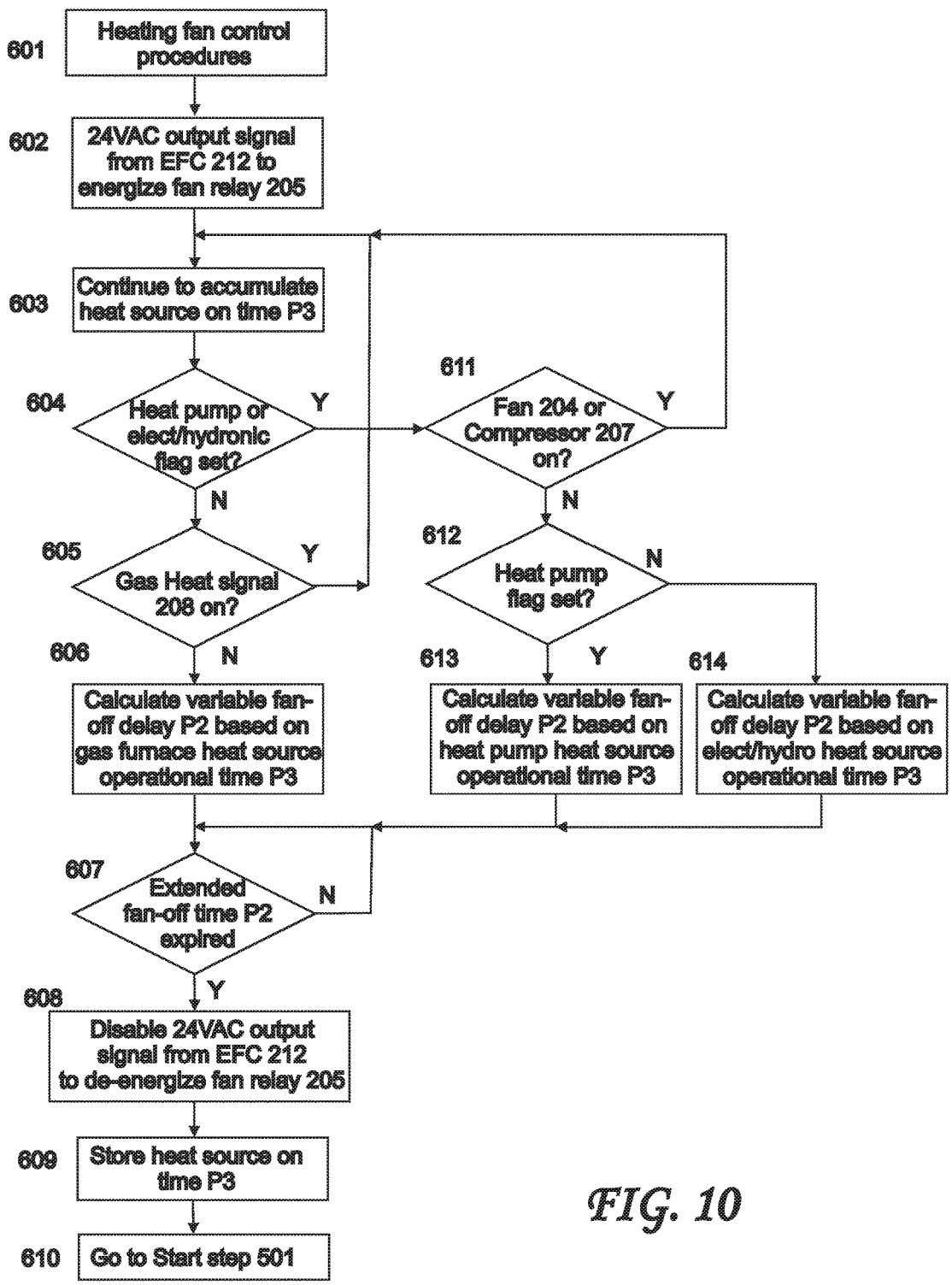
FIG. 10 shows a method for determining variable fan-on and fan-off time delays based on the heat mode operational time, according to the present invention.

FIG. 10 shows a method for heating according to the present invention. Step 601 is the beginning of the method for heating fan control procedures. Step 602 activates switch 301 which connects 24 VAC to the output 212. This in turn connects 24 VAC to the fan relay 205 which activates the system fan 206. Step 603 is the entry of a loop that runs continuously while the thermostat 201 is calling for heat, regardless of system type. The heat source operational time P3 is accumulated until the thermostat 201 is satisfied and discontinues the call for heating. Step 604 is used to check if the system is connected to a gas furnace or one of the other system configurations such as a heat pump, electric heating, or hydronic heating based on previous flag settings. If connected to a gas furnace, the efficient fan controller proceeds to Step 605, and if the gas furnace signal 208 to input 216 is still active, the efficient fan controller keeps looping and accumulating heat source operational time P3. If the efficient fan controller is not connected to a furnace, it uses the compressor signal 207 to input 215 or the fan signal 204 to input 214 to continue in the loop and accumulate heat source operational time P3. Step 606 is entered when the thermostat 201 call for heating has been satisfied and the gas furnace heat source has been de-activated. Step 606 now has all the necessary information to calculate the fan-off time delay P2 based on the heat source operational time P3, and the fact that the efficient fan controller is connected to a gas furnace. Step 607 continues to operate the system fan 206 for the variable fan-off time delay P2 until the time delay P2 has expired. After the time delay P2 has expired the efficient fan controller proceeds to Step 608 and turns off the switching device 301 which removes the 24 VAC from the efficient fan controller output 212 which in turn deactivates the fan relay 205 and the system fan 206. Step 609 stores the operational time P3 of the heat source for later use. Step 610 is entered when all the housekeeping is completed for the system heating mode and fan operation, and the system returns to the start Step 501 (see FIG. 9).

Step 611 is entered when the efficient fan controller is connected to either a heat pump, electric heater, or hydronic heat system and the thermostat 201 is calling for heating. Step 611 looks to see if the compressor signal 207 to input 215 or the fan signal 204 to input 214 are still active. At least one of these signals is active during the entire heating cycle. If either signal is active, then the efficient fan controller loops to accumulate the heat source operational time P3. Step 612 is entered when the thermostat 201 on the heat pump, electric, or hydronic system has been satisfied and de-energizes the heat source. Step 612 further determines if the just completed cycle was for a heat pump by examining the heat pump flag. The fan-off time delay P2 is then determined based on the type of system that called for heating. Step 613 is entered when the thermostat 201 has been satisfied and turns off the heat pump. Step 613 now has all the information necessary to calculate the fan-off time delay P2 based on the heat source operational time P3, and the efficient fan controller has determined that the controller is connected to a heat pump. Step 614 is entered when the thermostat 201 has been satisfied and turns off the electric or hydronic heat source. Step 614 now has all the information necessary to calculate the fan-off time delay P2 based on the heat source operational time P3, and the efficient fan controller has determined that it is connected to an electric or hydronic heat source.

Figure 11:
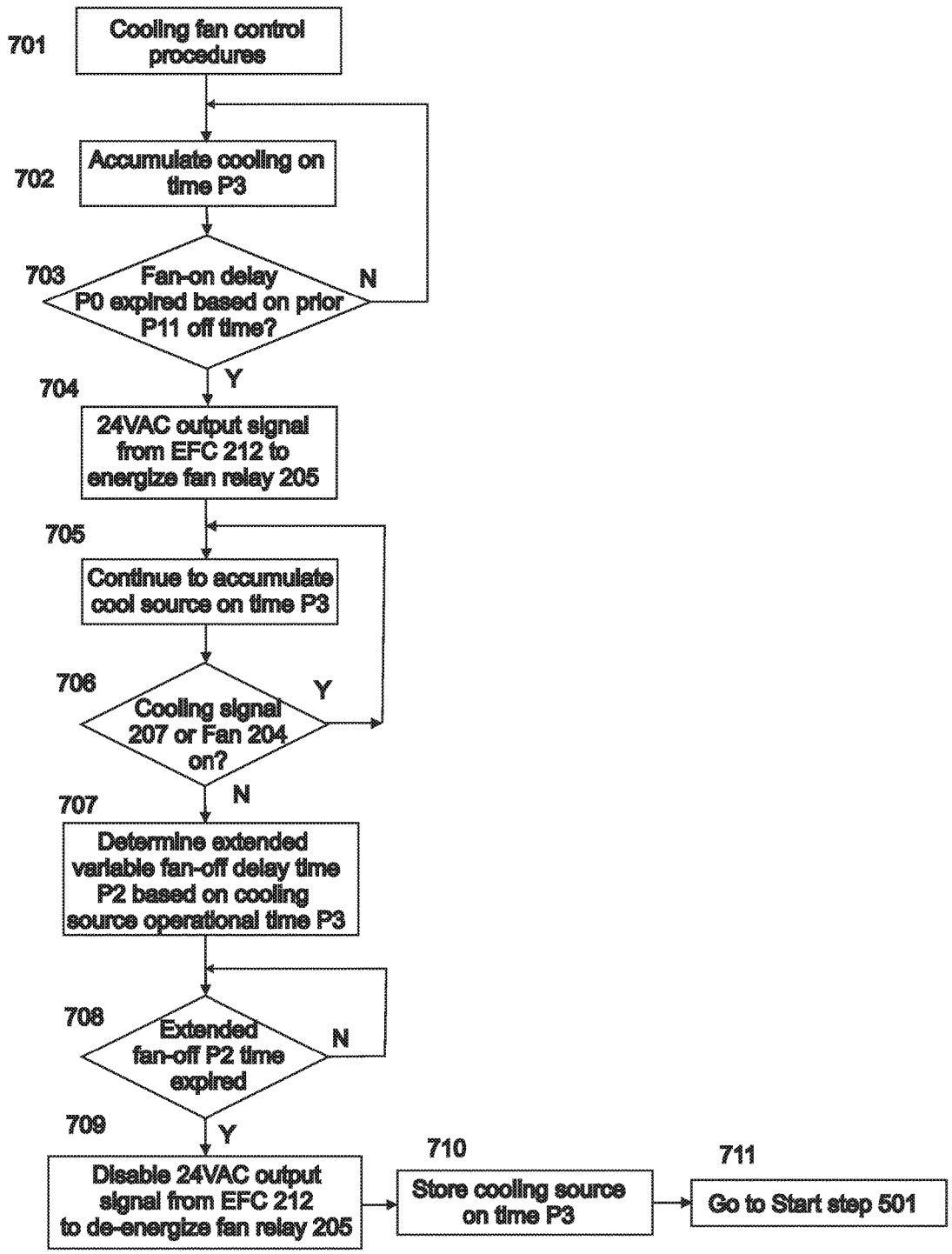
FIG. 11 shows a method for determining variable fan-on and fan-off time delays based on the cooling mode operational time, according to the present invention.

FIG. 11 shows a method for cooling fan control according to the present invention. Step 701 is the entry point for cooling or fan only operation of all types of systems. Step 702 is the entry point for a loop which accumulates the cooling source operational time P3. Step 703 evaluates whether or not the fan-on delay time P0 has expired based on the current cycle P3 and the previous cooling cycle off time P11. Step 703 is used to check if the delay time P0 has expired and if not, continue to accumulate operational time P3 for the entire duration of the cooling cycle. The efficient fan controller may set the cooling fan-on time delay P0 to zero. Step 704 activates switch 301 which connects 24 VAC signal to the output 212. This in turn connects 24 VAC to the fan relay 205 which activates the system fan 206. Step 705 is the entry of a loop that runs continuously while the thermostat 201 is calling for cooling. Step 705 continues to accumulate cooling operational time P3 until the thermostat 201 temperature is satisfied and discontinues to call for cooling. Step 706 checks the compressor cooling signal 207 to input 215 and fan signal 204 to input 214 to determine if cooling is still active, and if so continues to loop and accumulate the cooling operational time P3. Step 707 is entered when the thermostat 201 temperature setting has been satisfied and turns off the cooling compressor. Step 707 now has all the information necessary to calculate the fan-off time delay P2 based on the compressor operational time P3. Step 708 continues to operate the system fan 206 for the variable fan-off delay time P2 until the fan-off time delay P2 has expired. Step 709 turns off the switching device 301 which removes the 24 VAC from the efficient fan controller output 212 which in turn de-activates the fan relay 205 and the system fan 206. Step 710 stores the run time of the current cooling cycle P3 for later use. Step 711 is entered when all the housekeeping is completed for the system cooling mode and fan operation, and the system returns to the start step 501 (see FIG. 9).

While the invention herein disclosed has been described by means of specific embodiments and applications thereof, numerous modifications and variations could be made thereto by those skilled in the art without departing from the scope of the invention set forth in the claims.

We claim:

1. A fan controller (211) for a Heating Ventilation Air Conditioning (HVAC) system (100), the fan controller comprising:
    a microprocessor (304);
    at least one electrical input configured to receive an electrical signal from a thermostat or equipment control terminal (201), wherein the electrical input is selected from the group consisting of:
        1) a fan signal input (214) configured to connect to a thermostat G signal terminal (204) for the microprocessor (304) to monitor for an active G signal,
        2) an Air Conditioning (AC) signal input (215) configured to connect to a thermostat Y signal terminal (207) for the microprocessor (304) to monitor for an active Y signal, and
        3) a heat signal input (216), configured to connect to a thermostat W signal terminal (208) for the microprocessor (304) to monitor for an active W signal;
    a switching device (301) electrically connected to the microprocessor (304) to receive a control signal from the microprocessor (304);
    a fan relay signal output (212) from the switching device (301); and
    wherein the microprocessor (304) is configured to perform at least one action selected from the group consisting of:
        monitor a duration of a cooling cycle and determine a variable fan-off delay time based on the duration of the cooling cycle, and at an end of the cooling cycle, either energize or continue to energize the fan relay signal output (212) to operate a system fan (206) for the variable fan-off delay time to deliver additional cooling energy to a conditioned space wherein the variable fan-off delay time is determined in order to improve energy efficiency, and
        monitor a duration of a heating cycle and determine the variable fan-off delay time based on the duration of the heating cycle, and at an end of a heating cycle, either energize or continue to energize the fan relay signal output (212) to operate the system fan (206) for the variable fan-off delay time to deliver additional heating energy to the conditioned space wherein the variable fan-off delay time is determined in order to improve energy efficiency.

2. The fan controller (211) of claim 1, wherein the microprocessor (304) is configured to determine at least one duration selected from the group consisting of:
    the duration of the cooling cycle is based on monitoring at least one time period selected from the group consisting of:
        an active G signal duration with an inactive W signal,
        an active Y signal duration with the inactive W signal,
        the active G signal duration with the active Y signal and the inactive W signal, and
        a time period from when the thermostat initiates a call for cooling until the thermostat terminates the call for cooling; and
    the duration of the heating cycle is based on monitoring at least one time period selected from the group consisting of:
        an active W signal duration with an inactive G signal or an inactive Y signal,
        the active W signal duration with the active G signal and the inactive Y signal,
        the active W signal duration with the active G signal and the active Y signal, and
        a time period from when the thermostat initiates a call for heating until the thermostat terminates the call for heating.

3. A fan controller (211) of claim 1, wherein the fan controller is configured to receive power from at least one power source selected from the group consisting of:
    a system transformer (210), an AC-DC converter (303), and a battery (306).

4. A fan controller (211) of claim 1, wherein the microprocessor (304) is configured to determine the variable fan-off delay time based on the duration of the cooling cycle, and at the end of the cooling cycle either energize or continue to energize the control signal from the microprocessor (304) to the switching device (301) to the fan relay signal output (212) and the fan relay (205) to operate the system fan (206) for the variable fan-off delay time to deliver additional cooling energy to the conditioned space wherein the variable fan-off delay time is determined in order to improve energy efficiency.

5. The fan controller (211) of claim 4, wherein the duration of the cooling cycle is based on monitoring at least one time period selected from the group consisting of:
    an active G signal duration with an inactive W signal,
    an active Y signal duration with the inactive W signal,
    the active G signal duration with the active Y signal and the inactive W signal,
    a time period from when the thermostat initiates a call for cooling until the thermostat terminates the call for cooling.

6. A fan controller (211) of claim 1, wherein:
    the microprocessor (304) is configured to determine the variable fan-off delay time based on the duration of the heating cycle; and at the end of the heating cycle, either energize or continue to energize the control signal from the microprocessor (304) to the switching device (301) to the fan relay signal output (212) and the fan relay (205) to operate the system fan (206) for the variable fan-off delay time to deliver additional heating energy to the conditioned space wherein the variable fan-off delay time is determined in order to improve energy efficiency.

7. The fan controller (211) of claim 6, wherein the thermostat call for heating is based on monitoring at least one time period selected from the group consisting of:
an active W signal duration with an inactive G signal or an inactive Y signal;
the active W signal duration with the active G signal and the inactive Y signal,
the active W signal duration with the active G signal and the active Y signal, and a time period from when the thermostat initiates a call for heating until the thermostat terminates the call for heating.

8. The fan controller (211) of claim 1, wherein the microprocessor (304) is configured to detect on the signal inputs a signal input state selected from the group consisting of:
a zero signal,
an active signal, and
an inactive signal or a floating signal.

9. The fan controller (211) of claim 1, wherein the switching device (301) is electrically connected to the microprocessor (304) to receive the control signal from the microprocessor (304), and the fan controller (211) further includes a normally-closed relay (309) electrically connected to the switching device (301) to maintain continuity between the fan signal input 214 and the fan signal output 212 in an event of a failure of the fan controller.

10. The fan controller (211) of claim 1, wherein the microprocessor (304) is configured to:
determine if the thermostat call for cooling is active based on the active G signal or the active Y signal and an inactive W signal;
energize the control signal from the microprocessor (304) to the switching device (301) to energize the fan controller fan relay signal output (212) to energize the fan relay (205) and operate the system fan (206) while the thermostat call for cooling is active;
determine the duration of the cooling cycle based on an active G signal duration or an active Y signal duration; and
operate or continue to operate the system fan (206) at the end of the cooling cycle for a variable fan-off delay time based on the duration of the cooling cycle to deliver additional cooling energy to the conditioned space wherein the variable fan-off delay time is determined in order to improve energy efficiency.

11. The fan controller (211) of claim 1, wherein the microprocessor (304) is configured to:
determine if the thermostat call for heating is active based on the active W signal and an inactive G signal and an inactive Y signal;
energize the control signal from the microprocessor (304) to the switching device (301) to energize the fan controller fan relay signal output (212) to energize the fan relay (205) and operate the system fan (206) while the thermostat call for heating is active;
determine the duration of the heating cycle based on an active W signal duration; and
operate or continue to operate the system fan (206) at the end of the heating cycle for the variable fan-off delay time based on the duration of the heating cycle to deliver additional heating energy to the conditioned space wherein the variable fan-off delay time is determined in order to improve energy efficiency.

12. The fan controller (211) of claim 1, wherein the microprocessor (304) is configured to:
determine if the thermostat call for heating is active based on the active W signal and an inactive G signal and an inactive Y signal;
monitor the duration of the heating cycle based on an active W signal duration;
perform at least one action selected from the group consisting of:
energize the switching device (301) connected to the fan relay (205) to operate the system fan (206) to circulate air through a heating system,
wait while the active W signal is present and the heating system controls the system fan (206) to circulate air through the heating system, and
wait for a first time period while the heating system controls the system fan (206) to circulate air through the heating system and after a first time period with the system fan (206) operating, energize the switching device (301) connected to the fan relay (205) to operate the system fan (206) to circulate air through the heating system;
after the active W signal is no longer detected, set the duration of the heating cycle to the active W signal duration;
compute the variable fan-off delay time as a function of the duration of the heating cycle;
energize or continue to energize the switching device (301) connected to the fan relay (205) to operate the system fan (206) to circulate air through the heating system for the entire variable fan-off delay time, and
de-energize the switching device (301) connected to the fan relay (205) at the end of the variable fan-off delay time to deliver additional heating energy to the conditioned space wherein the variable fan-off delay time is determined in order to improve energy efficiency.

13. The fan controller (211) of claim 1, wherein the microprocessor (304) is configured to:
determine if the thermostat call for heating is active based on the active W signal and an inactive G signal and an inactive Y signal;
if the thermostat call for heating is active, then monitor the active W signal duration to determine the duration of the heating cycle;
perform at least one action selected from the group consisting of:
energize the fan controller fan relay signal output (212) to operate a system fan (206);
allow the heating system to control the system fan (206) and
after a first period of time energize the fan controller fan relay signal output (212) to operate a system fan (206) at a higher speed compared to when the fan controller fan relay signal output (212) is not energized and the system fan (206) is controlled by the heating system;
after the active W signal is no longer detected, determine the variable fan-off delay time based on the duration of the heating cycle; and
energize or continue to energize the fan controller fan relay signal output (212) to operate a system fan (206) for the variable fan-off delay time after the heating cycle has ended to deliver additional heating energy to the conditioned space wherein the variable fan-off delay time is determined in order to improve energy efficiency.

14. The fan controller (211) of claim 1, wherein the microprocessor (304) is configured to perform at least one action selected from the group consisting of:
close an economizer damper after the cooling cycle has ended and throughout the variable fan-off delay time,
adjust the economizer damper to a minimum position after the cooling cycle has ended and throughout the variable fan-off delay time and close the economizer damper at the end of the variable fan-off delay time,
close the economizer damper after the heating cycle has ended and throughout the variable fan-off delay time, and
adjust the economizer damper to the minimum position after the heating cycle has ended and throughout the variable fan-off delay time and close the economizer damper at the end of the variable fan-off delay time.

15. A fan controller (211) for a Heating Ventilation Air Conditioning (HVAC) system (100), the fan controller comprising:
a microprocessor (304);
at least one electrical input configured to receive an electrical signal from a thermostat or equipment control terminal (201), wherein the electrical input is selected from the group consisting of:
1) a fan signal input (214) configured to connect to a thermostat G signal terminal (204) for the microprocessor (304) to monitor for an active G signal,
2) an Air Conditioning (AC) signal input (215) configured to connect to a thermostat Y signal terminal (207) for the microprocessor (304) to monitor for an active Y signal,
3) a heat signal input (216), configured to connect to at least one thermostat terminal selected from the group consisting of:
a thermostat W heat terminal (208) for the microprocessor (304) to monitor for an active W signal;
a thermostat O Heat Pump (HP) reversing valve terminal (235) for the microprocessor (304) to monitor for an active O signal, and
a thermostat BR heat pump reversing valve terminal (236) for the microprocessor (304) to monitor for an active BR signal;
4) an HP Detection (HPD) signal input (234) configured to connect to a 24 VAC Hot signal (210b) from a system transformer (210) using at least one connection selected from the group consisting of:
a wire with a diode (275) for the microprocessor (304) to monitor for an active rectified HPD (234) signal, and
a wire (265) without the diode for the microprocessor (304) to monitor for an active sinusoidal HPD (234) signal;
a switching device (301) electrically connected to the microprocessor (304) to receive a control signal from the microprocessor (304);
a fan relay signal output (212) from the switching device (301); and
wherein the microprocessor (304) is configured to perform at least one action selected from the group consisting of:
monitor a thermostat call for cooling duration and determine a variable fan-off delay time based on the thermostat call for cooling duration, and at an end of a cooling cycle, either energize or continue to energize the fan relay signal output (212) to operate a system fan (206) for the variable fan-off delay time to deliver additional cooling energy to a conditioned space wherein the variable fan-off delay time is determined in order to improve energy efficiency, and
monitor a thermostat call for heating duration and determine the variable fan-off delay time based on the thermostat call for heating duration, and at an end of a heating cycle, either energize or continue to energize the fan relay signal output (212) to operate the system fan (206) for the variable fan-off delay time to deliver additional heating energy to the conditioned space wherein the variable fan-off delay time is determined in order to improve energy efficiency.

16. The fan controller (211) of claim 15, wherein the microprocessor (304) is configured to determine at least one duration selected from the group consisting of:
the thermostat call for cooling duration based on monitoring at least one time period selected from the group consisting of:
an active G signal duration with an inactive W signal,
an active Y signal duration with the inactive W signal,
the active G signal duration with the active Y signal and the inactive W signal,
the active G signal duration with the inactive W signal with the active rectified HPD signal,
the active G signal duration with the active W signal with the active sinusoidal HPD signal,
the active Y signal duration with the inactive W signal with the active rectified HPD signal,
the active Y signal duration with the active W signal with the active sinusoidal HPD signal, and
a time period from when the thermostat initiates a call for cooling until the thermostat terminates the call for cooling; and
the thermostat call for heating duration based on monitoring at least one time period selected from the group consisting of:
an active W signal duration with an inactive G signal or an inactive Y signal,
the active W signal duration with the active G signal and the inactive Y signal,
the active W signal duration with the active G signal and the active Y signal,
the active G signal duration with the inactive W signal with the active sinusoidal HPD signal,
the active G signal duration with the active W signal with the active rectified HPD signal,
the active Y signal duration with the inactive W signal with the active sinusoidal HPD signal,
the active Y signal duration with the active W signal with the active rectified HPD signal, and
a time period from when the thermostat initiates a call for heating until the thermostat terminates the call for heating.

17. A fan controller (211) of claim 15, wherein the fan controller is configured to receive power from at least one power source selected from the group consisting of: the system transformer (210), an AC-DC converter (303), a battery (306), and a super capacitor (312).

18. A fan controller (211) of claim 15, wherein the microprocessor (304) is configured to determine the variable fan-off delay time based on the thermostat call for cooling duration, and at the end of the cooling cycle, either energize or continue to energize the control signal from the microprocessor (304) to the switching device (301) to the fan relay signal output (212) and the fan relay (205) to operate the system fan (206) for the variable fan-off delay time to deliver additional cooling energy to the conditioned space wherein the variable fan-off delay time is determined in order to improve energy efficiency.

19. The fan controller (211) of claim 18, wherein the thermostat call for cooling duration is based on monitoring at least one time period selected from the group consisting of:
   the active G signal duration with an inactive W signal,
   an active Y signal duration with the inactive W signal,
   the active G signal duration with the active Y signal and the inactive W signal,
   the active G signal duration with the inactive W signal with the active rectified HPD signal,
   the active G signal duration with the active W signal with the active sinusoidal HPD signal,
   the active Y signal duration with the inactive W signal with the active rectified HPD signal,
   the active Y signal duration with the active W signal with the active sinusoidal HPD signal, and
   a time period from when the thermostat initiates a call for cooling until the thermostat terminates the call for cooling.

20. A fan controller (211) of claim 15, wherein the microprocessor (304) is configured to determine the variable fan-off delay time based on the thermostat call for heating duration, and at the end of the heating cycle, either energize or continue to energize the control signal from the microprocessor (304) to the switching device (301) to the fan relay signal output (212) and the fan relay (205) to operate the system fan (206) for the variable fan-off delay time to deliver additional heating energy to the conditioned space wherein the variable fan-off delay time is determined in order to improve energy efficiency.

21. The fan controller (211) of claim 20, wherein the thermostat call for heating duration is based on monitoring at least one time period selected from the group consisting of:
   an active W signal duration with an inactive G signal or an inactive Y signal;
   the active W signal duration with the active G signal and the inactive Y signal,
   the active W signal duration with the active G signal and the active Y signal,
   the active G signal duration with an inactive W signal with the active sinusoidal HPD signal,
   the active G signal duration with the active W signal with the active rectified HPD signal,
   the active Y signal duration with the inactive W signal with the active sinusoidal HPD signal,
   the active Y signal duration with the active W signal with the active rectified HPD signal, and
   a time period from when the thermostat initiates a call for heating until the thermostat terminates the call for heating.

22. The fan controller (211) of claim 15, wherein the microprocessor (304) is configured to detect on the signal inputs, a signal input state selected from the group consisting of:
   a zero signal,
   the active sinusoidal signal,
   the rectified signal, and
   an inactive or a floating signal.

23. The fan controller (211) of claim 15, wherein the switching device (301) is electrically connected to the microprocessor (304) to receive the control signal from the microprocessor (304), and the fan controller (211) further includes a normally-closed relay (309) electrically connected to the switching device (301) to maintain continuity between the fan signal input (214) and the fan signal output (212) in an event of a failure of the fan controller.

24. The fan controller (211) of claim 15, wherein the microprocessor (304) is configured to:
   determine if the thermostat call for cooling is active based on monitoring at least one signal combination selected from the group consisting of:
      the active G signal with an inactive W signal,
      the active Y signal with the inactive W signal,
      the active G signal with the active Y signal and the inactive W signal,
      the active G signal with the inactive W signal with the active rectified HPD signal,
      the active G signal with the active W signal with the active sinusoidal HPD signal,
      the active Y signal with the inactive W signal with the active rectified HPD signal, and
      the active Y signal with the active W signal with the active sinusoidal HPD signal;
   energize the control signal from the microprocessor (304) to the switching device (301) to energize the fan controller fan relay signal output (212) to energize the fan relay (205) and operate the system fan (206) while the thermostat call for cooling is active;
   determine the thermostat call for cooling duration based on at least one duration selected from a group consisting of:
      an active G signal duration with the inactive W signal,
      an active Y signal duration with the inactive W signal,
      the active G signal duration with the active Y signal and the inactive W signal,
      the active G signal duration with the inactive W signal with the active rectified HPD signal,
      the active G signal duration with the active W signal with the active sinusoidal HPD signal,
      the active Y signal duration with the inactive W signal with the active rectified HPD signal,
      the active Y signal duration with the active W signal with the active sinusoidal HPD signal, and
      a time period from when the thermostat initiates a call for cooling until the thermostat terminates the call for cooling; and
   determine the variable fan-off delay time based on the thermostat call for cooling duration, and at the end of the cooling cycle, operate or continue to operate the system fan (206) for the variable fan-off delay time to deliver additional cooling energy to the conditioned space wherein the variable fan-off delay time is determined in order to improve energy efficiency.

25. The fan controller (211) of claim 15, wherein the microprocessor (304) is configured to:
   determine if the thermostat call for heating is active based on monitoring at least one signal combination selected from the group consisting of:
      the active W signal with an inactive G signal or an inactive Y signal,
      the active W signal with the active G signal and the inactive Y signal,
      the active W signal with the active G signal and the active Y signal,
      the active G signal with an inactive W signal with the active sinusoidal HPD signal, the active G signal with the active W signal with the active rectified HPD signal,
the active Y signal with the inactive W signal with the active sinusoidal HPD signal, and
the active Y signal duration with the active W signal with the active rectified HPD signal;
energize the control signal from the microprocessor (304) to the switching device (301) to energize the fan controller fan relay signal output (212) to energize the fan relay (205) and operate the system fan (206) while the thermostat call for heating is active;
determine the thermostat call for heating duration based at least one duration selected from a group consisting of:
an active W signal duration with the inactive G signal or the inactive Y signal;
the active W signal duration with the active G signal and the inactive Y signal,
the active W signal duration with the active G signal and the active Y signal,
an active G signal duration with the inactive W signal with the active sinusoidal HPD signal,
the active G signal duration with the active W signal with the active rectified HPD signal,
the active Y signal duration with the inactive W signal with the active sinusoidal HPD signal,
the active Y signal duration with the active W signal with the active rectified HPD signal, and
the thermostat call for heating duration defined from when the thermostat initiates a call for heating until the thermostat terminates the call for heating; and
determine the variable fan-off delay time based on the thermostat call for heating duration, and at the end of the heating cycle operate or continue to operate the system fan (206) for the variable fan-off delay time to deliver additional heating energy to the conditioned space wherein the variable fan-off delay time is determined in order to improve energy efficiency.

26. The fan controller (211) of claim 15, wherein the microprocessor (304) is configured to:
determine if the thermostat call for heating is active based on monitoring at least one signal combination selected from the group consisting of:
the active W signal with an inactive G signal or an inactive Y signal;
the active W signal with the active G signal and the inactive Y signal,
the active W signal with the active G signal and the active Y signal,
the active G signal with an inactive W signal with the active sinusoidal HPD signal,
the active G signal with the active W signal with the active rectified HPD signal,
the active Y signal with the inactive W signal with the active sinusoidal HPD signal, and
the active Y signal duration with the active W signal with the active rectified HPD signal;
monitor and store the thermostat call for heating duration based at least one duration selected from a group consisting of:
an active W signal duration with the inactive G signal or the inactive Y signal;
the active W signal duration with the active G signal and the inactive Y signal,
the active W signal duration with the active G signal and the active Y signal,
an active G signal duration with an inactive W signal with the active sinusoidal HPD signal,
the active G signal duration with the active W signal with the active rectified HPD signal,
the active Y signal duration with the inactive W signal with the active sinusoidal HPD signal,
the active Y signal duration with the active W signal with the active rectified HPD signal, and
a time period from when the thermostat initiates a call for heating until the thermostat terminates the call for heating; and
perform at least one action selected from the group consisting of:
energize the switching device (301) connected to the fan relay (205) to operate the system fan (206) to circulate air through a heating system,
wait while the thermostat call for heating is active and the heating system controls the system fan (206) to circulate air through the heating system, and
wait for a first time period while the heating system controls the system fan (206) to circulate air through the heating system and after a first time period with the system fan (206) operating, energize the switching device (301) connected to the fan relay (205) to operate the system fan (206) to circulate air through the heating system; and
after the active W signal is no longer detected, compute the variable fan-off delay time as a function of the thermostat call for heating duration;
energize or continue to energize the switching device (301) connected to the fan relay (205) to operate the system fan (206) to circulate air through the heating system for the entire variable fan-off delay time, and de-energize the switching device (301) connected to the fan relay (205) at the end of the variable fan-off delay time to deliver additional heating energy to the conditioned space wherein the variable fan-off delay time is determined in order to improve energy efficiency.

27. The fan controller (211) of claim 15, wherein the microprocessor (304) is configured to:
determine if the thermostat call for heating is active based on monitoring at least one signal combination selected from the group consisting of:
the active W signal with an inactive G signal or an inactive Y signal;
the active W signal with the active G signal and the inactive Y signal,
the active W signal with the active G signal and the active Y signal,
the active G signal with an inactive W signal with the active sinusoidal HPD signal,
the active G signal with the active W signal with the active rectified HPD signal,
the active Y signal with the inactive W signal with the active sinusoidal HPD signal, and
the active Y signal duration with the active W signal with the active rectified HPD signal; and
determine the thermostat call for heating duration if the thermostat call for heating is active, based at least one duration selected from a group consisting of:
an active W signal duration with the inactive G signal or the inactive Y signal;
the active W signal duration with the active G signal and the inactive Y signal,
the active W signal duration with the active G signal and the active Y signal,
an active G signal duration with an inactive W signal with the active sinusoidal HPD signal, the active G signal duration with the active W signal with the active rectified HPD signal, the active Y signal duration with the inactive W signal with the active sinusoidal HPD signal, the active Y signal duration with the active W signal with the active rectified HPD signal, and a time period from when the thermostat initiates a call for heating until the thermostat terminates the call for heating; and perform at least one action selected from the group consisting of:

energize the fan controller fan relay signal output (212) to operate a system fan (206), allow the heating system to control the system fan (206), and after a first period of time, energize the fan controller fan relay signal output (212) to operate a system fan (206) at a higher speed compared to when the fan controller fan relay signal output (212) is not energized and the system fan (206) is controlled by the heating system;

after thermostat call for heating is inactive, determine a variable fan-off delay time based on the thermostat call for heating duration; and energize or continue to energize the fan controller fan relay signal output (212) to operate a system fan (206) for the variable fan-off delay time after the heating cycle has ended to deliver additional heating energy to the conditioned space wherein the variable fan-off delay time is determined in order to improve energy efficiency.

28. The fan controller (211) of claim 15, wherein the microprocessor (304) is configured to perform at least one action selected from the group consisting of:

close an economizer damper after the cooling cycle has ended and throughout the variable fan-off delay time, adjust the economizer damper to a minimum position after the cooling cycle has ended and throughout the variable fan-off delay time and close the economizer damper at the end of the variable fan-off delay time, close the economizer damper after the heating cycle has ended and throughout the variable fan-off delay time, and adjust the economizer damper to the minimum position after the heating cycle has ended and throughout the variable fan-off delay time and close the economizer damper at the end of the variable fan-off delay time.

29. The fan controller (211) of claim 15, wherein the microprocessor (304) is configured to determine a system type and cooling or heating mode based on signals present on the HVAC thermostat or equipment terminals (201) for at least one system type selected from the group consisting of:

a direct expansion air conditioning system operating in cooling mode, a heat pump system operating in cooling mode, a hydronic coil system operating in cooling mode, a gas furnace system operating in heating mode, the heat pump system operating in heating mode, the hydronic coil system operating in heating mode, and an electric resistance system operating in heating mode.

30. The fan controller (211) of claim 15, wherein the switching device (301) is electrically connected to the microprocessor (304) to receive a control signal from the microprocessor (304), and further including a normally-closed relay (309) electrically connected to the switching device (301) to maintain continuity between the fan signal input (214) and the fan signal output (212) in the event of a failure of the fan controller.

31. A fan controller (211) for a Heating Ventilation Air Conditioning (HVAC) system (100), the fan controller comprising:

a microprocessor (304);

at least one electrical input configured to receive an electrical signal from a thermostat or equipment control terminal (201), wherein the electrical input is selected from the group consisting of:

1) a fan signal input (214) configured to connect to a thermostat G signal terminal (204) for the microprocessor (304) to monitor for an active G signal, 2) an Air Conditioning (AC) signal input (215) configured to connect to a thermostat Y signal terminal (207) for the microprocessor (304) to monitor for an active Y signal, and 3) a heat signal input (216), configured to connect to a thermostat W signal terminal (208) for the microprocessor (304) to monitor for an active W signal;

a switching device (301) electrically connected to the microprocessor (304) to receive a control signal from the microprocessor (304);

a fan relay signal output (212) from the switching device (301); and wherein the microprocessor (304) is configured to perform at least one action selected from the group consisting of:

monitor a cooling cycle duration and determine a variable fan-off delay time based on the cooling cycle duration, and after the thermostat terminates a call for cooling, either energize or continue to energize the fan relay signal output (212) to operate a system fan (206) for the variable fan-off delay time to deliver additional cooling energy to a conditioned space wherein the variable fan-off delay time is determined in order to improve energy efficiency, and monitor a heating cycle duration and determine a variable fan-off delay time based on the heating cycle duration, and at an end of a heating cycle, either energize or continue to energize the fan relay signal output (212) to operate the system fan (206) for the variable fan-off delay time to deliver additional heating energy to the conditioned space wherein the variable fan-off delay time is determined in order to improve energy efficiency.

32. The fan controller (211) of claim 31, wherein the microprocessor (304) is configured to determine at least one cooling cycle duration selected from the group consisting of:

a cooling on time defined from when the thermostat initiates a call for cooling until the thermostat terminates the call for cooling, and a cooling off time defined from when the thermostat terminates the call for cooling until the thermostat initiates the call for cooling plus the cooling on time.

33. The fan controller (211) of claim 31, wherein the microprocessor (304) is configured to determine at least one heating cycle duration selected from the group consisting of:

a heating on time defined from when the thermostat initiates a call for heating until the thermostat terminates the call for heating, and a heating off time defined from when the thermostat terminates the call for heating until the thermostat initiates the call for heating plus the heating on time.

34. The fan controller (211) of claim 31, wherein the microprocessor (304) is configured to determine at least one duration selected from the group consisting of:
the cooling cycle duration based on at least one time period selected from the group consisting of:
an active G signal duration with an inactive W signal,
an inactive G signal duration with the inactive W signal,
the active Y signal duration with the inactive W signal,
an inactive Y signal duration with the inactive W signal,
the active G signal duration with the active Y signal and the inactive W signal,
the inactive G signal duration with the inactive Y signal and the inactive W signal,
a cooling on time from when the thermostat initiates a call for cooling until the thermostat terminates the call for cooling, and
the cooling off time defined from when the thermostat terminates the call for cooling until the thermostat initiates the call for cooling plus the cooling on time; and
the heating cycle duration based on at least one time period selected from the group consisting of:
an active W signal duration with an inactive G signal or an inactive Y signal,
an inactive W signal duration with the inactive G signal or the inactive Y signal,
the active W signal duration with the active G signal and the inactive Y signal,
the inactive W signal duration with the inactive G signal and the inactive Y signal,
the active W signal duration with the active G signal and the inactive Y signal,
the inactive W signal duration with the inactive G signal and the inactive Y signal,
a heating on time from when the thermostat initiates a call for heating until the thermostat terminates the call for heating, and
the heating off time defined from when the thermostat terminates the call for heating until the thermostat initiates the call for heating plus the heating on time.

35. A fan controller (211) of claim 31, wherein the fan controller is configured to receive power from at least one power source selected from the group consisting of: a system transformer (210), an AC-DC converter (303), and a battery (306).

36. A fan controller (211) of claim 31, wherein the microprocessor (304) is configured to determine the variable fan-off delay time based on the cooling cycle duration, and at the end of the cooling cycle, either energize or continue to energize the control signal from the microprocessor (304) to the switching device (301) to the fan relay signal output (212) and the fan relay (205) to operate the system fan (206) for the variable fan-off delay time to deliver additional cooling energy to the conditioned space wherein the variable fan-off delay time is determined in order to improve energy efficiency.

37. The fan controller (211) of claim 36, wherein the cooling cycle duration is based on at least one time period selected from the group consisting of:
an active G signal duration with an inactive W signal,
an inactive G signal duration with the inactive W signal,
an active Y signal duration with the inactive W signal,
an inactive Y signal duration with the inactive W signal,
the active G signal duration with the active Y signal and the inactive W signal,
the inactive G signal duration with an inactive Y signal and the inactive W signal,
a cooling on time from when the thermostat initiates a call for cooling until the thermostat terminates the call for cooling, and
a cooling off time defined from when the thermostat terminates the call for cooling until the thermostat initiates the call for cooling plus the cooling on time.

38. A fan controller (211) of claim 31, wherein:
the microprocessor (304) is configured to determine the variable fan-off delay time based on the heating cycle duration; and
at the end of the heating cycle, either energize or continue to energize the control signal from the microprocessor (304) to the switching device (301) to the fan relay signal output (212) and the fan relay (205) to operate the system fan (206) for the variable fan-off delay time to deliver additional heating energy to the conditioned space wherein the variable fan-off delay time is determined in order to improve energy efficiency.

39. The fan controller (211) of claim 38, wherein the heating cycle duration is based on at least one time period selected from the group consisting of:
an active W signal duration with an inactive G signal or an inactive Y signal,
an inactive W signal duration with the inactive G signal or the inactive Y signal,
the active W signal duration with the active G signal and the inactive Y signal,
the inactive W signal duration with the inactive G signal and the inactive Y signal,
the active W signal duration with the active G signal and the active Y signal,
a heating on time from when the thermostat initiates a call for heating until the thermostat terminates the call for heating, and
a heating off time defined from when the thermostat terminates the call for heating until the thermostat initiates the call for heating plus the heating on time.

40. The fan controller (211) of claim 31, wherein the microprocessor (304) is configured to detect on the signal inputs, a signal input state selected from the group consisting of:
a zero signal,
an active signal, and
an inactive or floating signal.

41. The fan controller (211) of claim 31, wherein:
the switching device (301) is electrically connected to the microprocessor (304) to receive the control signal from the microprocessor (304); and
the fan controller (211) further includes a normally-closed relay (309) electrically connected to the switching device (301) to maintain continuity between the fan signal input 214 and the fan signal output 212 in an event of a failure of the fan controller.

42. The fan controller (211) of claim 31, wherein the microprocessor (304) is configured to:
determine if the cooling cycle is inactive based on an inactive G signal or an inactive Y signal, and if the cooling cycle is inactive, then determine an inactive cooling cycle duration based on an inactive G signal duration or an inactive Y signal duration;
determine if the cooling cycle is active based on the active G signal or the active Y signal and an inactive W signal, and if the cooling cycle is active, and then energize the control signal from the microprocessor (304) to the switching device (301) to energize the fan controller fan relay signal output (212) to energize the fan relay (205) and operate the system fan (206) while the cooling cycle is active;

determine the cooling cycle duration based on the active G signal duration, or the active Y signal duration, or the inactive G signal duration plus the active G signal duration, or an inactive Y signal duration plus the active Y signal duration; and operate or continue to operate the system fan (206) at the end of the cooling cycle for a variable fan-off delay time based on the cooling cycle duration to deliver additional cooling energy to the conditioned space wherein the variable fan-off delay time is determined in order to improve energy efficiency.

43. The fan controller (211) of claim 31, wherein the microprocessor (304) is configured to:

determine if the heating cycle is inactive based on an inactive W signal, and if the heating cycle is inactive, then determine an inactive heating cycle duration based on an inactive W signal duration;

determine if the heating cycle is active based on the active W signal and an inactive G signal and an inactive Y signal, and if the heating cycle is active, then energize the control signal from the microprocessor (304) to the switching device (301) to energize the fan controller fan relay signal output (212) to energize the fan relay (205) and operate the system fan (206) while the heating cycle is active;

determine the heating cycle duration based on the active W signal duration, or the inactive W signal duration plus the active W signal duration; and operate or continue to operate the system fan (206) at the end of the heating cycle for a variable fan-off delay time based on the heating cycle duration to deliver additional heating energy to the conditioned space wherein the variable fan-off delay time is determined in order to improve energy efficiency.

44. The fan controller (211) of claim 31, wherein the microprocessor (304) is configured to:

determine if the heating cycle is inactive based on an inactive W signal, and if the heating cycle is inactive, then determine an inactive heating cycle duration based on an inactive W signal duration;

determine if the heating cycle is active based on the active W signal and an inactive G signal and an inactive Y signal, and if the heating cycle is active, then perform at least one action selected from the group consisting of:

energize the switching device (301) connected to the fan relay (205) to operate the system fan (206) to circulate air through a heating system, wait while the active W signal is present and the heating system controls the system fan (206) to circulate air through the heating system, and wait for a first time period while the heating system controls the system fan (206) to circulate air through the heating system, and after a first time period with the system fan (206) operating, energize the switching device (301) connected to the fan relay (205) to operate the system fan (206) to circulate air through the heating system;

after the active W signal is no longer detected, determine the heating cycle duration based on the active W signal duration, or the sum of the inactive W signal duration plus the active W signal duration;

compute the variable fan-off delay time as a function of the heating cycle duration; and energize, or continue to energize, the switching device (301) connected to the fan relay (205) to operate the system fan (206) to circulate air through the heating system for the entire variable fan-off delay time; and de-energize the switching device (301) connected to the fan relay (205) at the end of the variable fan-off delay time to deliver additional heating energy to the conditioned space wherein the variable fan-off delay time is determined in order to improve energy efficiency.

45. The fan controller (211) of claim 31, wherein the microprocessor (304) is configured to:

determine if the heating cycle is inactive based on an inactive W signal and an inactive G signal and an inactive Y signal, and if the heating cycle is inactive, then determine an inactive heating cycle duration based on an inactive W signal duration;

determine if the heating cycle is active based on the active W signal and the inactive G signal and the inactive Y signal, and if the heating cycle is active, then perform at least one action selected from the group consisting of:

energize the fan controller fan relay signal output (212) to operate a system fan (206);

allow a heating system to control the system fan (206), and after a first period of time, energize the fan controller fan relay signal output (212) to operate a system fan (206) at a higher speed compared to when the fan controller fan relay signal output (212) is not energized and the system fan (206) is controlled by the heating system;

after the active W signal is no longer detected, determine the heating cycle duration based on an active W signal duration, or the sum of the inactive W signal duration plus the active W signal duration;

determine a variable fan-off delay time based on the heating cycle duration; and energize or continue to energize the fan controller fan relay signal output (212) to operate a system fan (206) for the variable fan-off delay time after the heating cycle has ended to deliver additional heating energy to the conditioned space wherein the variable fan-off delay time is determined in order to improve energy efficiency.

46. The fan controller (211) of claim 31, wherein the microprocessor (304) is configured to perform at least one action selected from the group consisting of:

close an economizer damper after the cooling cycle has ended and throughout the variable fan-off delay time, adjust the economizer damper to a minimum position after the cooling cycle has ended and throughout the variable fan-off delay time and close the economizer damper at the end of the variable fan-off delay time, close the economizer damper after the heating cycle has ended and throughout the variable fan-off delay time, and adjust the economizer damper to the minimum position after the heating cycle has ended and throughout the variable fan-off delay time and close the economizer damper at the end of the variable fan-off delay time.

* * * * *